(12) United States Patent
Oki

(10) Patent No.: US 8,698,467 B2
(45) Date of Patent: Apr. 15, 2014

(54) MULTI-MODE DC-DC POWER CONVERTERS

(75) Inventor: Hideta Oki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/710,873

(22) Filed: Feb. 23, 2010

(65) Prior Publication Data
US 2010/0213911 A1 Aug. 26, 2010

(30) Foreign Application Priority Data

Feb. 24, 2009 (JP) .................................. 2009-41084

(51) Int. Cl.
*H02M 3/156* (2006.01)

(52) U.S. Cl.
USPC ............................ 323/282; 323/284; 323/288

(58) Field of Classification Search
USPC ......... 323/223, 224, 271, 280–285, 351, 259, 323/344
See application file for complete search history.

(56) References Cited

U.S. PATENT DOCUMENTS

| 5,594,324 | A | * | 1/1997 | Canter et al. | 323/282 |
|---|---|---|---|---|---|
| 6,147,478 | A | | 11/2000 | Skelton et al. | |
| 6,933,706 | B2 | * | 8/2005 | Shih | 323/222 |
| 7,045,993 | B1 | * | 5/2006 | Tomiyoshi | 323/224 |
| 7,145,316 | B1 | * | 12/2006 | Galinski, III | 323/288 |
| 7,221,134 | B1 | | 5/2007 | Ling | |
| 7,425,819 | B2 | * | 9/2008 | Isobe | 323/222 |
| 7,936,160 | B1 | * | 5/2011 | Sheehan | 323/285 |
| 8,217,633 | B2 | | 7/2012 | Shimizu | |
| 2002/0135345 | A1 | * | 9/2002 | Terashi | 323/283 |
| 2005/0067363 | A1 | | 3/2005 | Noma et al. | |
| 2006/0049815 | A1 | * | 3/2006 | Ho et al. | 323/282 |
| 2006/0119340 | A1 | | 6/2006 | Tateishi | |
| 2007/0139027 | A1 | | 6/2007 | Nishimori | |
| 2008/0030178 | A1 | * | 2/2008 | Leonard et al. | 323/282 |
| 2008/0061750 | A1 | * | 3/2008 | Stoichita | 323/271 |

(Continued)

FOREIGN PATENT DOCUMENTS

| JP | 8-251911 A | 9/1996 |
|---|---|---|
| JP | 09-135568 | 5/1997 |

(Continued)

OTHER PUBLICATIONS

Japanese Office Action, Notification of Reasons for Refusal, dated Mar. 19, 2013, 4 pages.

(Continued)

*Primary Examiner* — Adolf Berhane
*Assistant Examiner* — Gustavo Rosario Benitez
(74) *Attorney, Agent, or Firm* — Arent Fox LLP

(57) ABSTRACT

A semiconductor integrated circuit includes: a first switching element and a second switching element that are provided in series between a first power line and a second power line; a power supply circuit that outputs a given output voltage by on/off controlling the first switching element and the second switch element; a current detection circuit that detects a current corresponding to an output load current of the power supply circuit; a switching time control circuit that controls a switching time defined by a power supply voltage and the output voltage based on a current value detected by the current detection circuit; and a switching element control circuit that controls the first switching element and the second switching element based on an output signal of the switching time control circuit.

22 Claims, 35 Drawing Sheets

(56) References Cited

U.S. PATENT DOCUMENTS

| | | | |
|---|---|---|---|
| 2008/0111530 A1* | 5/2008 | Hasegawa et al. | 323/284 |
| 2008/0111531 A1* | 5/2008 | Hasegawa et al. | 323/284 |
| 2008/0252274 A1* | 10/2008 | Schindler | 323/282 |
| 2009/0079409 A1* | 3/2009 | Chang | 323/284 |
| 2009/0102440 A1* | 4/2009 | Coles | 323/271 |
| 2009/0128113 A1* | 5/2009 | Ryoo | 323/283 |
| 2009/0167259 A1* | 7/2009 | Miyamae | 323/225 |
| 2010/0001704 A1* | 1/2010 | Williams | 323/283 |
| 2010/0301821 A1* | 12/2010 | Kung et al. | 323/283 |

FOREIGN PATENT DOCUMENTS

| | | |
|---|---|---|
| JP | 2005-110369 A | 4/2005 |
| JP | 2007-174772 A | 7/2007 |
| JP | 2007-318830 A | 12/2007 |

OTHER PUBLICATIONS

Office Action, Japanese Patent Application No. 2009-041084 dated Dec. 10, 2013.

* cited by examiner

Io=0A

TRANSIENT STATE

MULTI-MODE DC-DC POWER CONVERTERS

CROSS-REFERENCE TO RELATED APPLICATIONS

This application is based upon and claims the benefit of priority of the prior Japanese Patent Application No. 2009-041084, filed on Feb. 24, 2009, the entire contents of which are incorporated herein by reference.

FIELD

The present disclosure relates to a semiconductor integrated circuit and a power supply device.

BACKGROUND

Recently, direct-current to direct-current conversion (DC-DC) converters (power supply devices) that convert a given power supply voltage into a desired voltage and output the desired voltage have been widely used for various electronic devices such as a portable terminal. A fixed on-time DC-DC converter utilizing a bottom detection comparator method is proposed as such a DC-DC converter.

FIG. 1 is a block diagram schematically illustrating one example of a power supply device and a fixed on-time DC-DC converter utilizing a bottom detection comparator method.

In FIG. 1, the reference numeral 100 indicates a DC-DC converter (power supply device), the reference numeral 10 indicates an IC (semiconductor integrated circuit) for DC-DC conversion, the reference numeral 1 indicates an error comparator, and the reference numeral 102 indicates an on period ($t_{on}$) generator.

Moreover, the reference numeral 3 indicates an RS flip flop, the reference numeral 4 indicates a drive logic circuit (a switching element control circuit), the reference numerals 51 and 52 indicate a first and a second switching transistors (nMOS transistors) respectively, the reference numeral 6 indicates a coil, and the reference numeral 7 indicates a smoothing capacitor.

As illustrated in FIG. 1, the power supply device 100 includes the semiconductor integrated circuit 10, the switching transistors 51 and 52, the coil 6, and the smoothing capacitor 7.

The transistors 51 and 52 are coupled in series between a high-potential power line to which a power supply voltage $V_{IN}$ is applied and a grounding wire to which a ground potential GND is applied. In the power supply device 100 illustrated in FIG. 1, the transistors 51 and 52 are provided outside of the semiconductor integrated circuit 10, however the transistors 51 and 52 may be provided inside of the semiconductor integrated circuit 10 as well.

The drive logic circuit 4 supplies a control signal DRVH to a gate of the transistor 51 and a control signal DRVL to a gate of the transistor 52 and thereby controls ON/OFF of the transistors 51 and 52.

A short period that turns off both the transistors 51 and 52 is inserted at switching, for example, by using an Anti Shoot Through (AST) circuit to prevent both transistors from turning on and to prevent a through-current from flowing.

A node LX (LX terminal) of the transistors 51 and 52 is coupled to an output terminal OUT of the power supply device 100 through the coil 6. The smoothing capacitor 7 is provided between the output terminal OUT and the grounding wire GND.

An equivalent series resistance (ESR) indicates parasitic resistance of the smoothing capacitor 7. The ESR may be provided as a separate resistor instead of as parasitic resistance.

The semiconductor integrated circuit 10 includes an error comparator 1, a $t_{on}$ generator 102, an RS flip flop 3, the drive logic circuit 4, and resistors $R_1$, $R_2$, and $R_t$.

The error comparator 1 compares a voltage FB, which is obtained by dividing an output voltage Vo at the resistors R1 and R2, with a reference voltage VREF, and supplies an output signal ERROUT to a set terminal S of the flip flop 3.

The $t_{on}$ generator 102 supplies an output signal TONOUT to a reset terminal R of the flip flop 3. An output signal Q of the flip flop 3, a power supply voltage $V_{IN}$, an output voltage Vo, and a control signal DRVL of the transistor 52 etc. are supplied to the $t_{on}$ generator 102. The $t_{on}$ generator 102 is coupled to the grounding wire GND through the resistor $R_t$.

The fixed on-time DC-DC converter 100 utilizing a bottom detection comparator method with the above configuration controls an output voltage Vo by using a fixed on-time defined by a power supply voltage $V_{IN}$ and an output voltage Vo, and by using a ripple voltage in an output voltage Vo due to the ESR.

A current is supplied from the high potential power line through the transistor 51 during the on period "$t_{on}$" (fixed on time). This increases a coil current $I_{LX}$ that flows in the coil 6 and raises the output voltage Vo, for example, due to parasitic resistance ESR of the smoothing capacitor 7.

As described above, it is ensured that the transistor 52 is turned off while the transistor 51 is turned on.

On the other hand, during an off period "$t_{off}$", energy accumulated in the coil 6 is supplied to a load Ro. This decreases a coil current IL that flows in the coil 6 and causes the output voltage Vo to drop due to the parasitic resistance ESR of the smoothing capacitor 7.

When a voltage obtained by dividing an output voltage Vo at the resistor R1 and the resistor R2 reaches a reference voltage VREF or less, an output signal ERROUT of the error comparator 1 becomes a high level "H", and the RS flip flop 3 is set.

The Q output of the RS flip flop 3 becomes a high level "H", and the period turns to the on period "$t_{on}$" again. By repeating the on period "$t_{on}$" and the off period "$t_{off}$", an average value of the output voltage Vo is maintained at a given level.

In other words, the error comparator 1 of the DC-DC converter 100 utilizing a bottom detection comparator method compares the divided output voltage Vo with the reference voltage VREF and controls duty during an off period "$t_{off}$". Accordingly, the DC-DC converter 100 stabilizes the output voltage Vo.

FIG. 2 is a circuit diagram illustrating one example of the $t_{on}$ generator 102 in the power supply device illustrated in FIG. 1. As illustrated in FIG. 2, the $t_{on}$ generator 102 includes resistors $R_{31}$, $R_{32}$, $R_{51}$, and $R_{52}$, comparators 21 and 27, pMOS transistors 22 and 23, an npn bipolar transistor 24, a capacitor 25, and an nMOS transistor 26.

A resistor $R_t$ in FIG. 2 corresponds to the resistor $R_t$ illustrated in FIG. 1 that is provided outside of the $t_{on}$ generator 102 in FIG. 1.

The comparator 21 compares a voltage obtained by dividing a power supply voltage $V_{IN}$ at the resistor $R_{31}$ and the resistor $R_{32}$ with an emitter voltage of the transistor 24, and supplies the output signal to a base of the transistor 24. This makes a given current $I_{20}$ flow between the base and the emitter of the transistor.

A current $I_{21}$ corresponding to the current $I_{20}$ that flows through the transistor 24 flows through the transistor 23 by the current-mirror coupled transistors 22 and 23.

While the transistor 51 is turned on, electric charges from the current $I_{21}$ are accumulated in the capacitor 25. When a voltage VCT from the capacitor 25 exceeds the voltage Vtref obtained by dividing the output voltage Vo at the resistors $R_{51}$ and the $R_{52}$, an output signal TONOUT of the comparator 27 is output.

This resets the RS flip flop 3, the Q output becomes a low level "L", and the on period "$t_{on}$" ends.

While the switching transistor 52 is turned on, in other words, the switching transistor 51 is turned off, the control signal DRVL is at a high level "H", and thus the transistor 26 is turned on and no electric charge is accumulated in the capacitor 25.

Various DC-DC converters for outputting a voltage controlled to a given level have been proposed.

In the power supply device described by referring to FIGS. 1 and 2, the "on time" is fixed depending on the power supply voltage Vin and the output voltage Vo. Hence, output voltage characteristics such as regulation may be degraded when an output load current Io is changed.

SUMMARY

According to an aspect of an embodiment, a semiconductor integrated circuit includes: a first switching element and a second switching element that are provided in series between a first power line and a second power line; a power supply circuit that outputs a given output voltage by on/off controlling the first switching element and the second switch element; a current detection circuit that detects a current corresponding to an output load current of the power supply circuit; a switching time control circuit that controls a switching time defined by a power supply voltage and the output voltage based on a current value detected by the current detection circuit; and a switching element control circuit that controls the first switching element and the second switching element based on an output signal of the switching time control circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Causes for degradation of load regulation in a power supply device illustrated in FIG. 1 will be discussed prior to describing respective embodiments of the semiconductor integrated circuit and the power supply device.

Figure 1:
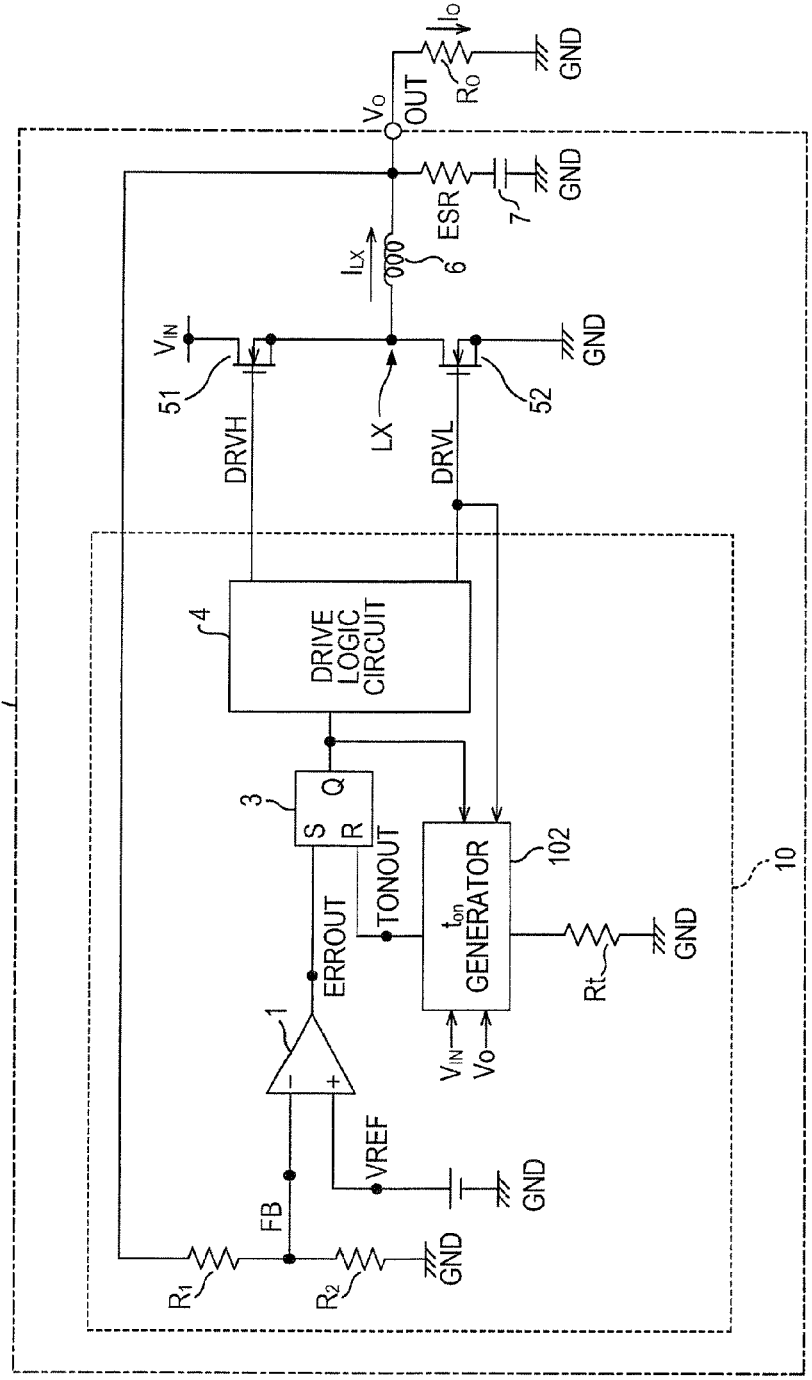
FIG. 1 is a block diagram schematically illustrating one example of a power supply device.
Figure 3:
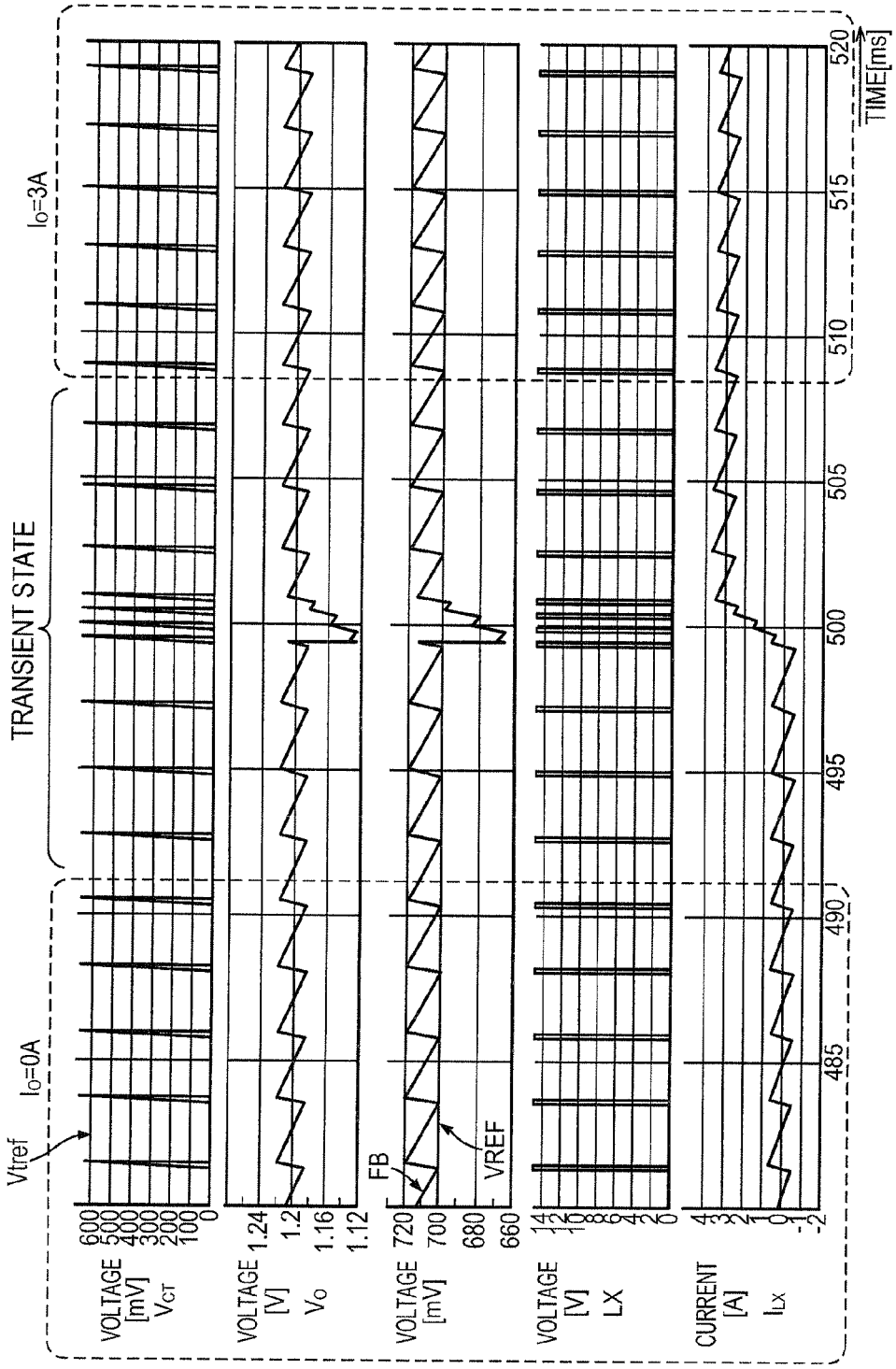
FIG. 3 illustrates an example of simulation waveforms of the power supply device illustrated in FIG. 1.
Figure 4:
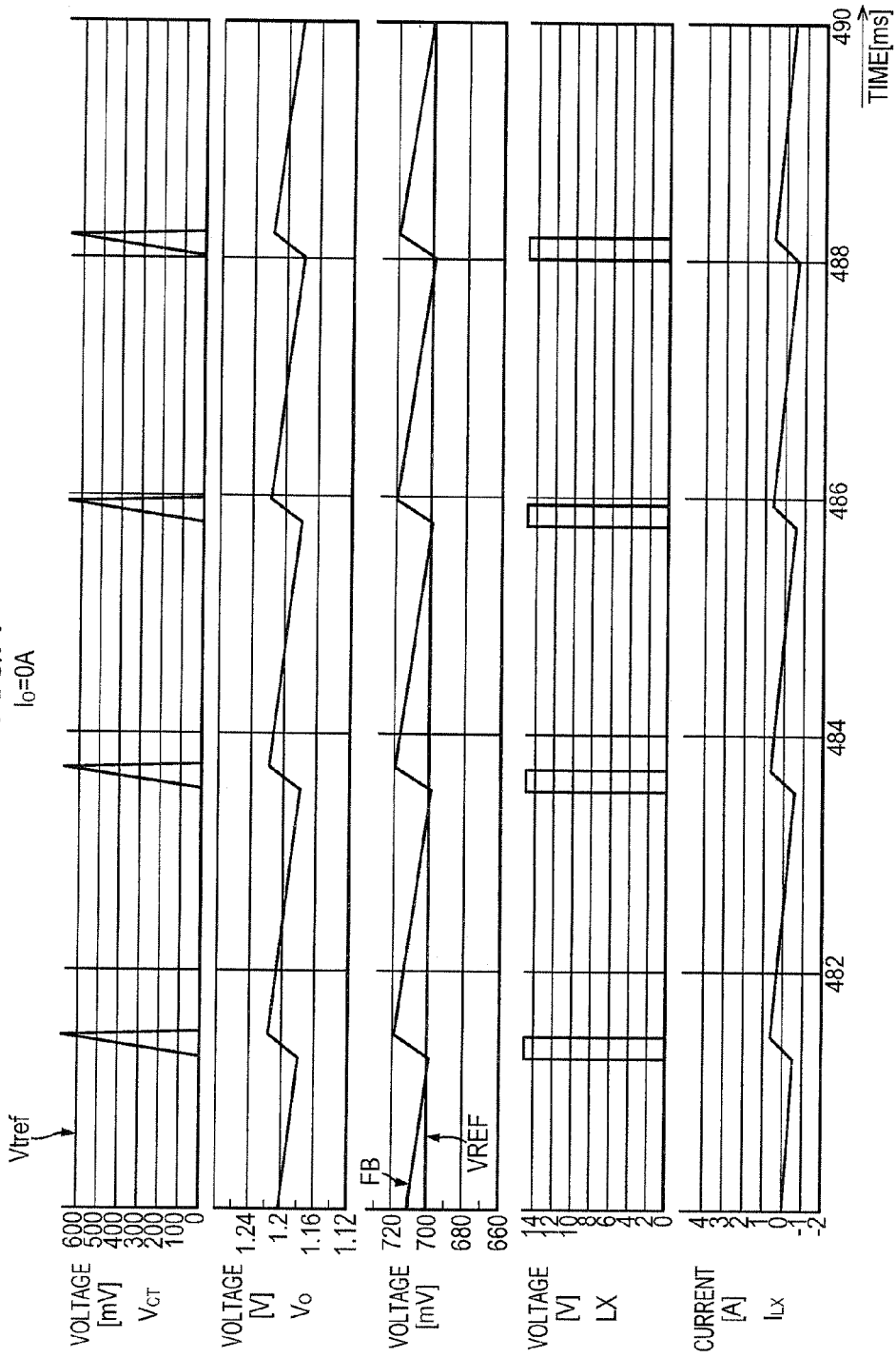
FIG. 4 illustrates the enlarged simulation waveforms illustrated in FIG. 3 when a load current is 0 A.
Figure 5:
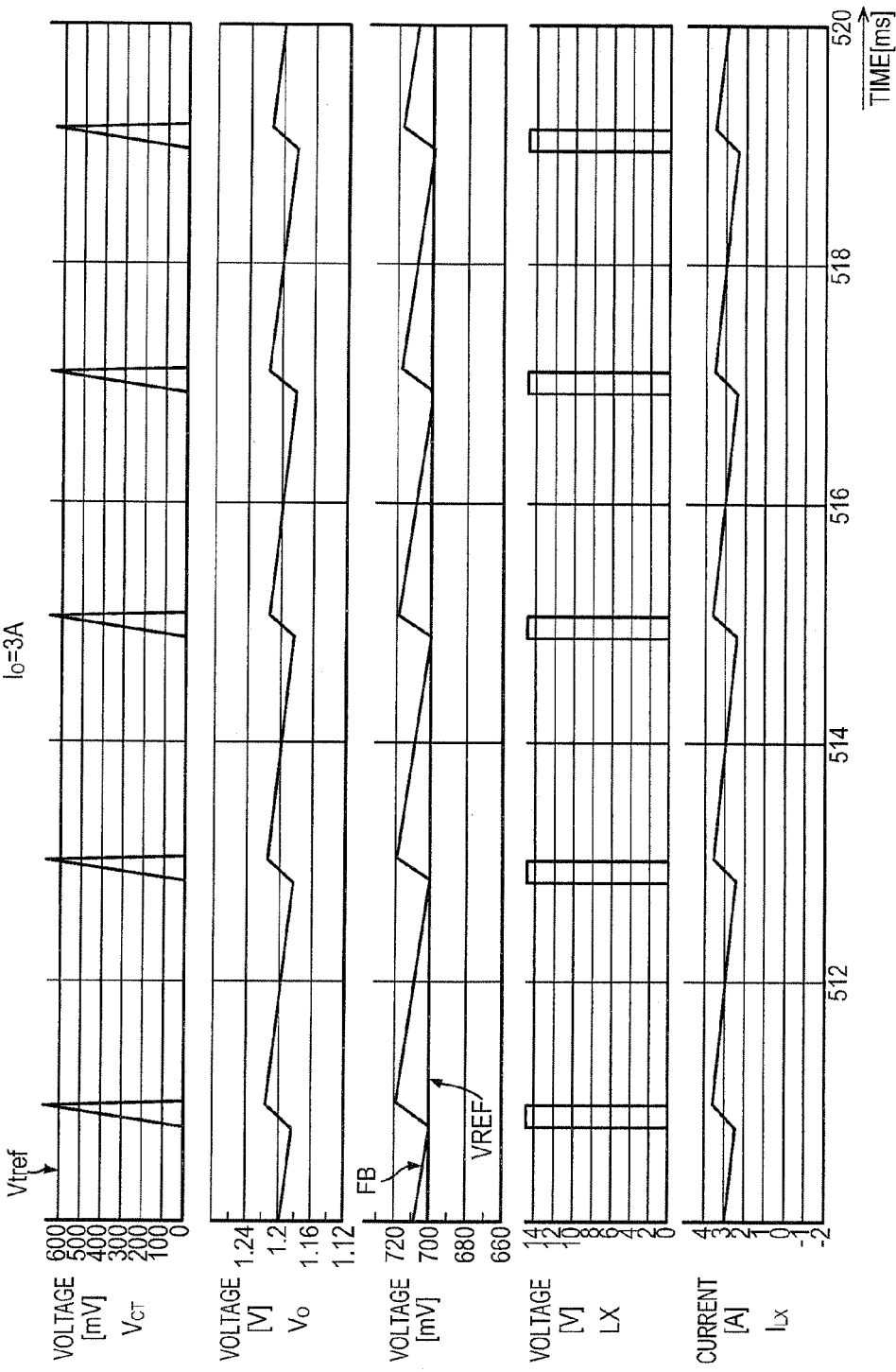
FIG. 5 illustrates the enlarged simulation waveforms illustrated in FIG. 3 when a load current is 3 A.

FIG. 3 illustrates an example of simulation waveforms of the power supply device illustrated in FIG. 1. FIGS. 4 and 5 illustrate waveforms obtained by partially enlarging the simulation waveforms illustrated in FIG. 3. FIG. 4 illustrates a state when a load current Io in the simulation waveforms illustrated in FIG. 3 is 0 A (unloaded state). FIG. 5 illustrates a state when a load current Io in the simulation waveforms illustrated in FIG. 3 is 3 A (loaded state).

As illustrated in FIG. 3, when a load current Io that flows through a load resistor Ro is changed from Io=0 A to Io=3 A, each waveform changes from the waveform illustrated in FIG. 4 to that illustrated in FIG. 5 after a transient state.

Figure 2:
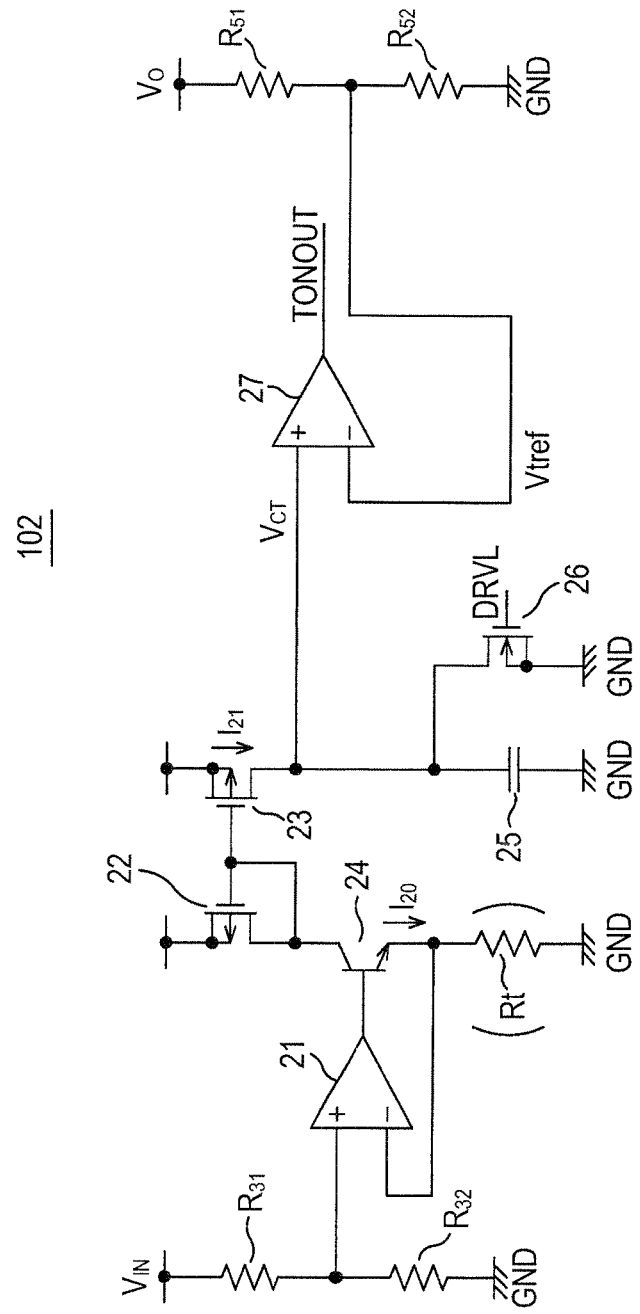
FIG. 2 is a circuit diagram illustrating one example of a $t_{on}$ generator in the power supply device illustrated in FIG. 1.

In FIGS. 3 to 5, the first waveform indicates input voltages $V_{CT}$ and Vtref of the comparator 27 illustrated in FIG. 2, the second waveform indicates an output voltage Vo, the third waveform indicates input voltages FB and VREF input to the error comparator 1 illustrated in FIG. 1, the fourth waveform indicates a voltage of a node LX, and the fifth waveform indicates a coil current $I_{LX}$.

Figure 6:
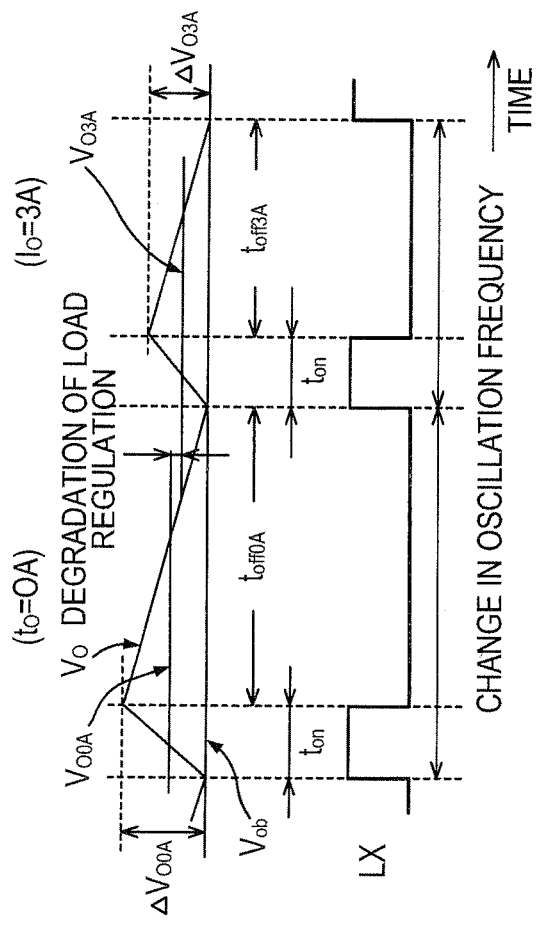
FIG. 6 illustrates a drawback of the power supply device illustrated in FIG. 1.

FIG. 6 illustrates a drawback of the power supply device illustrated in FIG. 1. FIG. 6 is obtained by combining FIG. 4 and FIG. 5 except for the transient state for simplification.

As illustrated in FIG. 6, the lowest voltage of the output voltage Vo is assumed to be a voltage Vob. The voltage Vob corresponding to a voltage FB, which is obtained by dividing an output voltage Vo at resistors R1 and R2 for comparison by the error comparator 1, becomes a reference voltage VREF. The output voltage Vo rises for a given "t on" period, and drops for a given "t off" period to the lowest voltage Vob.

Now, causes that lead to degradation of the load regulation will be described.

An output voltage ripple ΔVo depends on a current I ESR that flows into parasitic resistance ESR of the smoothing capacitor 7.

A coil current AC component I LX0A under a load current Io=0 A (unloaded state) is I LX0A=I ESR, whereas a coil current AC component I LX3A under a load current Io=3 A (loaded state) is determined by a resistance value RESR of the load resistor Ro and the parasitic resistance ESR of the smoothing capacitor 7.

The coil current AC component I LX3A is branched into an AC current I ESR of the resistance ESR and a current Io of the load resistor Ro, thus the current I resistance ESR is reduced and thereby an output voltage ΔVo is reduced. As the output voltage ΔVo becomes smaller, the load regulation is degraded because a change amount of the central voltage corresponds to an absolute change amount of the load regulation.

For example, the following expressions are obtained when an output voltage ripple is ΔVo0A under an unloaded state, while the output voltage ripple under a loaded state is ΔVo3A:

$$\Delta Vo0A=(VIN-Vo)/L \times Ton \times RESR$$

$$\Delta Vo3A=(VIN-Vo)L \times Ton \times \{(RESR \times RRo)/(RESR+RRo)\}$$

The above "Ton" indicates a time during a "t on" period, RESR indicates a resistance value of the resistance ESR, RRo indicates a resistance value of the load resistance Ro, and L indicates an inductance of the coil 6.

In other words, the output voltage ripple ΔVo0A under the unloaded state and the output voltage ripple ΔVo3A under a loaded state are different and may be expressed by ΔVo0A>ΔVo3A. This causes a potential difference between an average output voltage Vo0A under an unloaded state and an average output voltage Vo3A under a loaded state, and thereby the load regulation is degraded.

The time "Ton" is obtained by the following expression where α is a constant.

$$Ton=(Vo/V_{in}) \times R_t \alpha$$

As described above, the coil current $I_{LX}$ is shunted by the resistance ESR and the load resistance Ro, and this leads to degradation of the load regulation. The larger the value of ESR Ro is, the more significant the degradation of the load regulation will become.

Moreover, depending on the resistance of the switching transistor 51 and the coil 6, or the output load condition, an off period "t off0A" under an unloaded state and an off period "t off3A" under a loaded state, changes. Thus, there is a drawback in that the oscillation frequency is not constant.

In other words, when the oscillation frequency of the power supply device is not constant and changes with a given frequency width, noise measures needs to be taken for all of the frequency widths.

The above described drawback exists not only in the fixed on-time DC-DC converter utilizing a bottom detection comparator method but also in various power supply devices that control output voltages using a ripple voltage.

Moreover, a drawback in which an oscillation frequency of a power supply device changes with a given frequency width and noise measures need to be taken for all of the frequency widths, exists in power supply devices that do not use a ripple voltage as well.

Hereunder, embodiments of the semiconductor integrated circuit and the power supply device will be described in detail by referring to the accompanying drawings.

Figure 7:
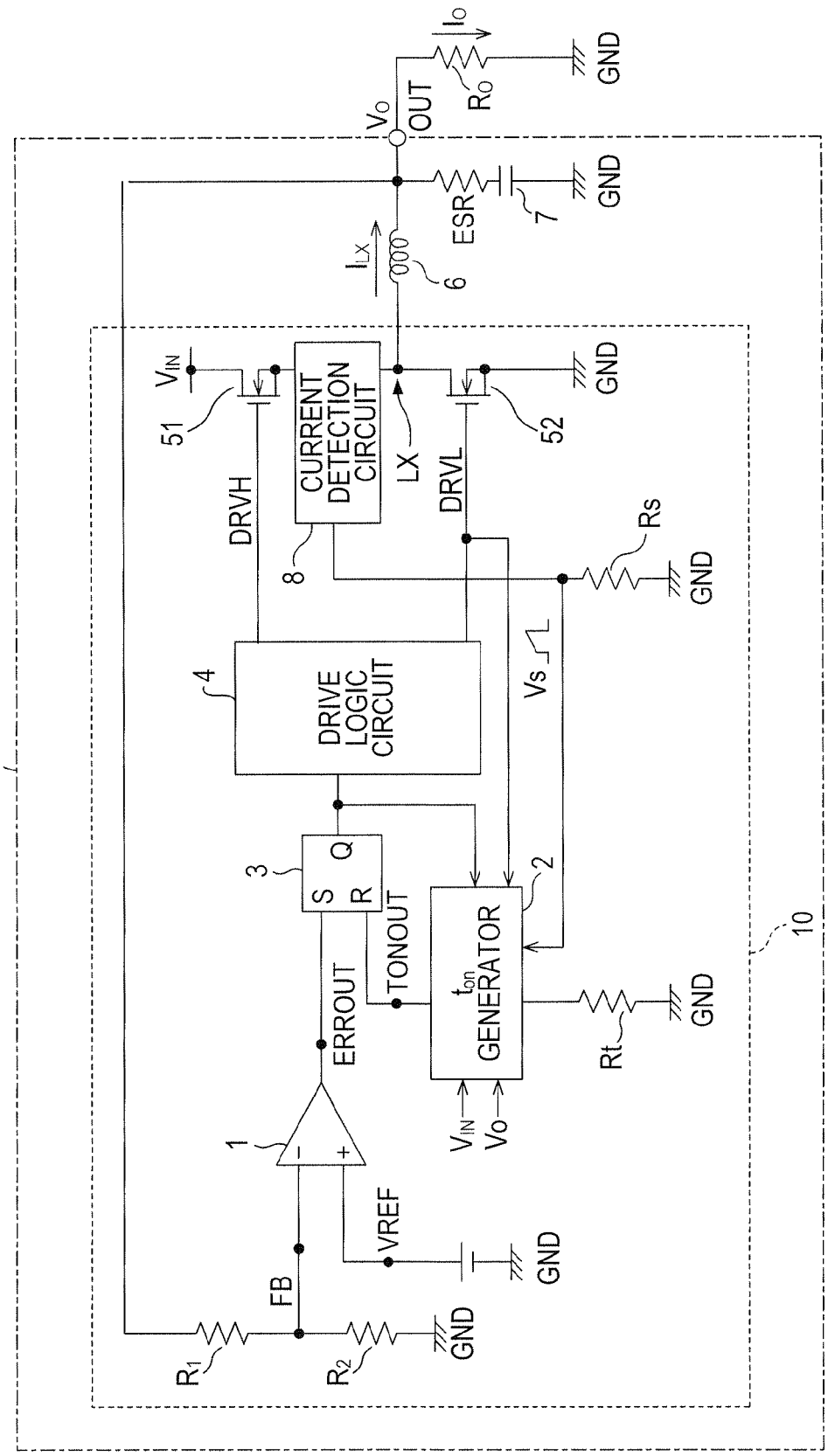
FIG. 7 is a block diagram schematically illustrating a power supply device according to a first embodiment.

FIG. 7 is a block diagram schematically illustrating a power supply device according to the first embodiment and illustrates a DC-DC converter utilizing a bottom detection comparator method.

In FIG. 7, the reference numeral 100 indicates a power supply device (a DC-DC converter utilizing a bottom detection comparator method), the reference numeral 10 indicates a semiconductor integrated circuit (an IC for the DC-DC converter), the reference numeral 1 indicates an error comparator, the reference numeral 2 indicates a $t_{on}$ generator, and the reference numeral 3 indicates an RS flip flop.

Moreover, the reference numeral 4 indicates a drive logic circuit, the reference numerals 51 and the 52 indicate the first and the second switching transistors (nMOS transistors), the reference numeral 6 indicates a coil, the reference numeral 7 indicates a smoothing capacitor, and the reference numeral 8 indicates a current detection circuit.

The $t_{on}$ generator 2 and the RS flip flop 3 correspond to a switching time control circuit that controls an on time (a switching time).

As illustrated in FIG. 7, the power supply device 100 includes the semiconductor integrated circuit 10, the coil 6, and the smoothing capacitor 7.

The semiconductor integrated circuit 10 includes the error comparator 1, the $t_{on}$ generator 2, the RS flip flop 3, the drive logic circuit 4, the switching transistors 51 and 52, the current detection circuit 8, and resistors $R_1$, $R_2$, $R_t$ and $R_s$.

The transistors 51 and 52 are coupled in series between a high-potential power line to which a power supply voltage $V_{IN}$ is applied and a grounding wire to which a ground potential GND is applied through the current detection circuit 8. The current detection circuit 8 is provided between a source of the transistor 51 and a connection node LX (a LX terminal).

Various known circuits such as a current detection circuit that detects a current by utilizing on resistance of the transistor 51 may be used as the current detection circuit 8. In the power supply device 100 illustrated in FIG. 7, the transistors 51 and 52 are provided inside of the semiconductor integrated circuit 10, however the transistors 51 and 52 may be provided outside of the semiconductor integrated circuit 10 as well. Moreover, for example, when a chip resistor is used for the current detection circuit 8, the chip resistor is provided outside of the circuit 10.

Control signals DRVH and DRVL are supplied to the gates of the transistors 51 and 52 from the drive logic circuit 4, and thereby the transistors 51 and 52 are on/off controlled.

A short period that turns off both the transistors 51 and 52 is inserted at switching, for example, by using an Anti Shoot Through (AST) circuit to prevent both transistors from turning on and a through-current from flowing.

The node LX is coupled to an output terminal OUT of the power supply device 100 through the coil 6. The smoothing capacitor 7 is provided between the output terminal OUT and the grounding wire GND. The resistance ESR indicates parasitic resistance of the smoothing capacitor 7. The resistance ESR may be provided as a separate resistor instead of parasitic resistance.

The error comparator 1 compares a voltage FB obtained by dividing an output voltage Vo at the resistors R1 and R2 with a reference voltage VREF, and supplies an output signal ERROUT to a set terminal S of the flip flop 3.

An output signal TONOUT of the $t_{on}$ generator 2 is supplied to a reset terminal R of the flip flop 3. An output signal Q of the flip flop 3, the power supply voltage $V_{IN}$, an output voltage Vo, and the control signal DVRL of the transistor 52 are supplied to the $t_{on}$ generator 2.

Moreover, according to the first embodiment, an output signal Vs of the current detection circuit 8 provided between the transistor 51 and the transistor 52, in other words, between the source of the transistor 51 and the node LX, is supplied to the $t_{on}$ generator 2.

The $t_{on}$ generator 2 is coupled to the grounding wire GND through the resistor $R_t$. A signal line that supplies the output signal Vs of the current detection circuit 8 is coupled to the grounding wire GND through the resistor $R_s$. FIG. 7 illustrates that a current detected by the current detection circuit 8 is supplied to the $t_{on}$ generator 2 after being converted into a voltage signal Vs by the resistor $R_s$.

Here, the current detected by the current detection circuit 8 corresponds to a coil current $I_{LX}$ that flows from the transistor 51 to the coil 6 through the node LX because the transistor 52 is turned off while the transistor 51 is turned on.

The DC-DC converter 100 applies a change depending on an output signal Vs of the current detection circuit 8 for an on time defined by the power supply voltage $V_{IN}$ and the output voltage Vo, and controls the output voltage Vo by utilizing a ripple voltage in the output voltage Vo due to the resistance ESR.

A current is supplied from the high-potential power line through the transistor 51 during an on period "t on" thereby increasing a coil current $I_{LX}$ that flows in the coil 6, and the output voltage Vo rises due to the parasitic resistance ESR of the smoothing capacitor 7.

The on period "t on" here corresponds to a variable on time adjusted according to the output signal Vs of the current detection circuit 8. As described above, it is substantially ensured that the transistor 52 is turned off while the transistor 51 is turned on.

On the other hand, during an off period "t off", energy accumulated in the coil 6 is supplied to a load resistance Ro. This decreases a coil current IL that flows in the coil 6 and causes the drop of the output voltage Vo due to the parasitic resistance ESR of the smoothing capacitor 7.

When a voltage obtained by dividing an output voltage Vo at the resistor R1 and the resistor R2 reaches a reference voltage VREF or lower, an output signal ERROUT of the error comparator 1 becomes a high level "H", and the RS flip flop 3 is set.

A Q output of the RS flip flop 3 becomes a high level "H", and the on period "t on" is turned on again through the $t_{on}$ generator 2. The on period "t on" is adjusted according to the output signal Vs of the current detection circuit 8.

By repeating an on period "t on" and an off period "t off", an average value of the output voltage Vo is maintained substantially constant.

Figure 8:
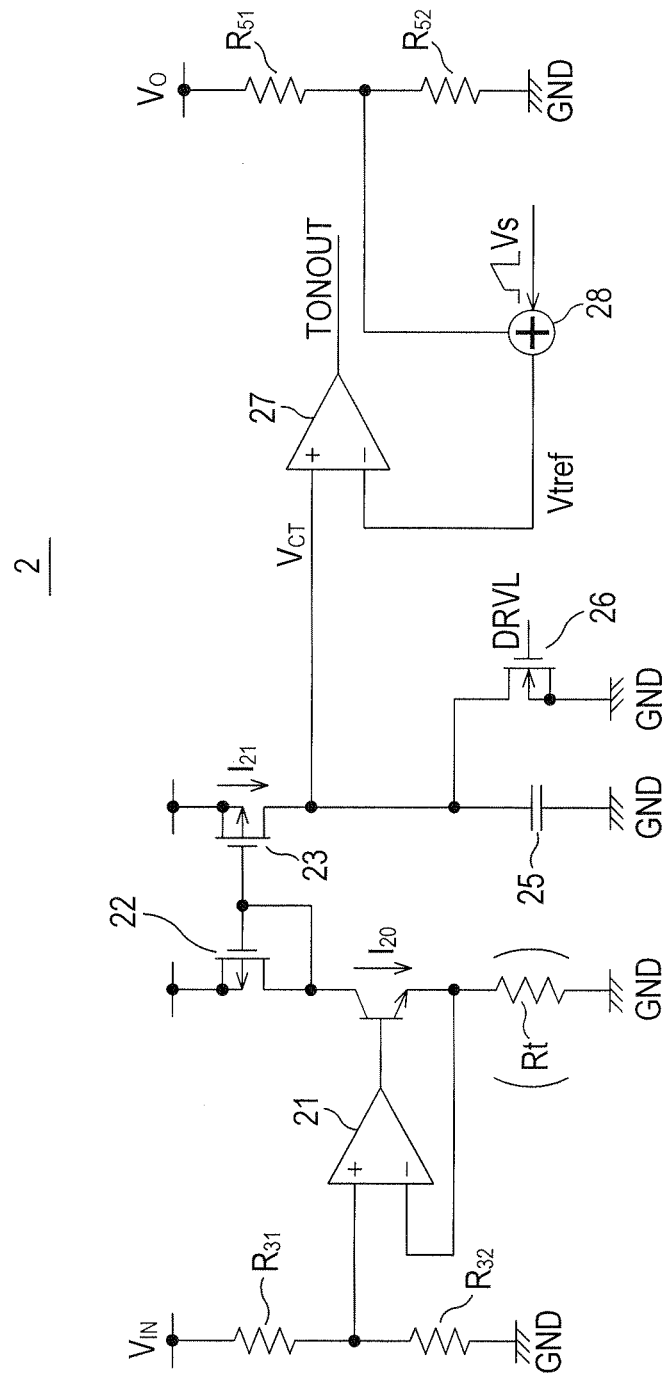
FIG. 8 is a circuit diagram illustrating one example of the $t_{on}$ generator in the power supply device illustrated in FIG. 7.

FIG. 8 is a circuit diagram illustrating one example of a $t_{on}$ generator in the power supply device illustrated in FIG. 7.

As illustrated in FIG. 8, the $t_{on}$ generator 2 includes resistors $R_{31}$, $R_{32}$, $R_{51}$, and $R_{52}$, comparators 21 and 27, pMOS transistors 22 and 23, an npn bipolar transistor 24, a capacitor 25, an nMOS transistor 26, and an adder 28. The resistor $R_t$ corresponds to the resistor $R_t$ that is provided outside of the $t_{on}$ generator 2 illustrated in FIG. 7.

The comparator 21 compares a voltage obtained by dividing the power supply voltage $V_{IN}$ at the resistor $R_{31}$ and the resistor $R_{32}$ with an emitter voltage of the transistor 24, and supplies the output signal to a base of the transistor 24. This makes a given current $I_{20}$ flow between the base and the emitter of the transistor 24. A current $I_{21}$ that corresponds to the current $I_{20}$ flowing in the transistor 24 flows through the transistor 23 by the current-mirror coupled transistors 22 and 23.

When the transistor 51 is turned on, electric charges by the current $I_{21}$ are accumulated in the capacitor 25. An output signal TONOUT of the comparator 27 is output when a voltage $V_{CT}$ by the capacitor 25 exceeds the voltage Vtref.

The voltage Vtref is a level of a voltage that is obtained by the addition performed by the adder 28 in which a voltage obtained by dividing an output voltage Vo at the resistors R51 and R52 and an output signal Vs of the current detection circuit 8 are added.

When an output signal TONOUT of the comparator 27 is output, the RS flip flop 3 is reset, the Q output becomes a low level "L", and thereby an on period "t on" ends.

When the switching transistor 52 is turned on, in other words, the switching transistor 51 is turned off, the control signal DRVL is at a high level "H", thus the transistor 26 is turned on and no electric charge is accumulated in the capacitor 25.

Figure 9:
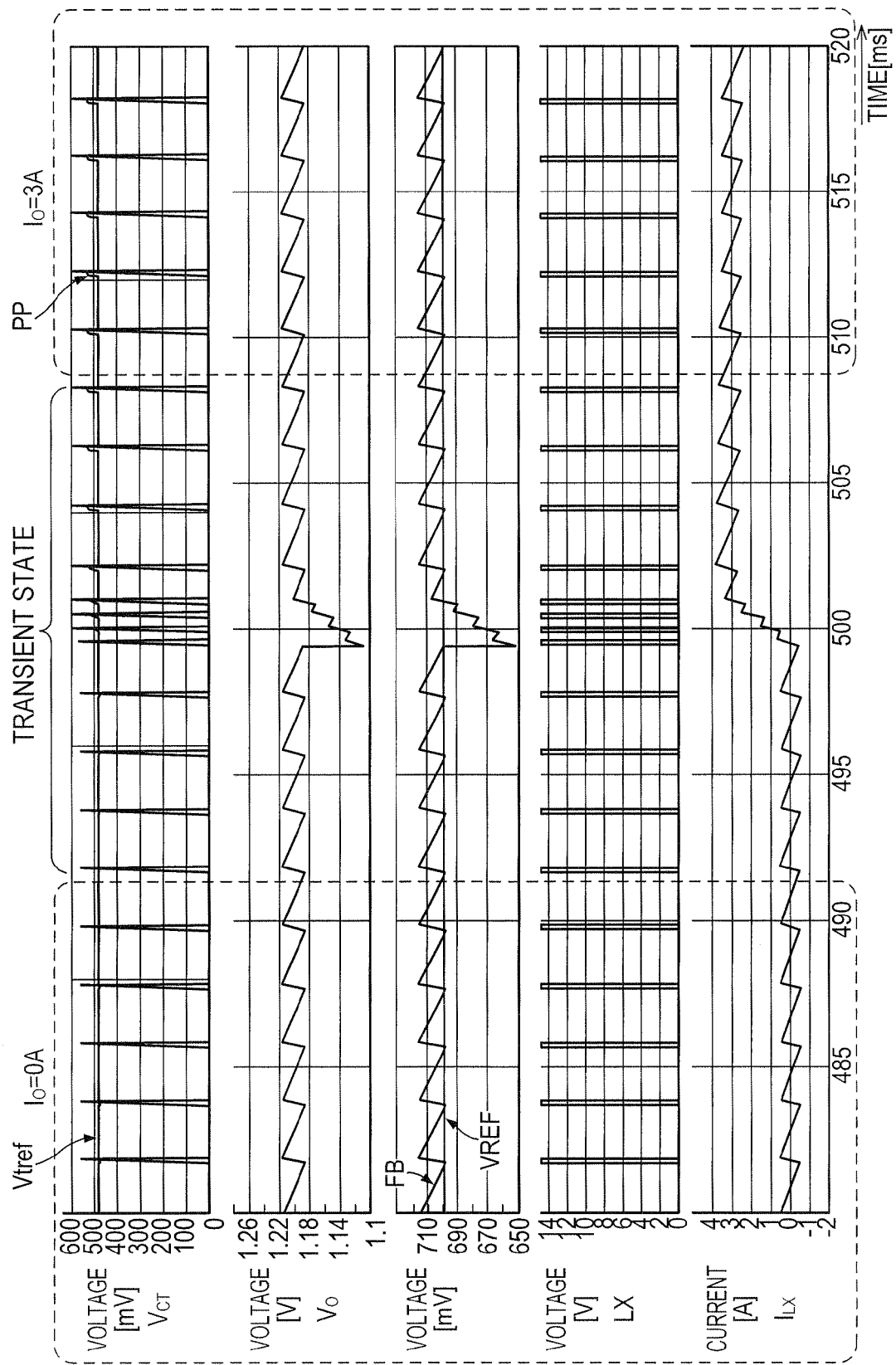
FIG. 9 illustrates one example of simulation waveforms of the power supply device according to the first embodiment.
Figure 10:
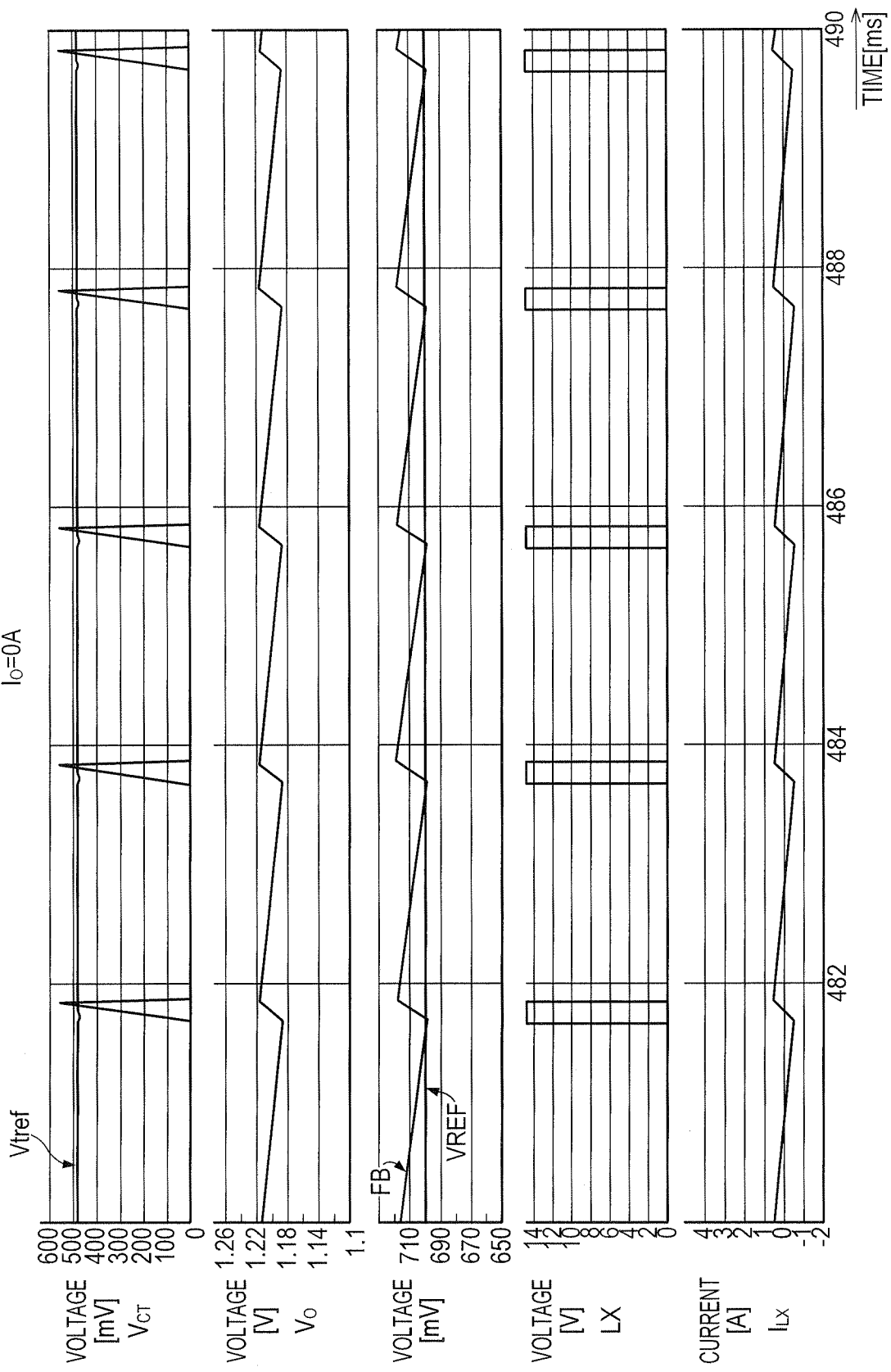
FIG. 10 illustrates the enlarged simulation waveforms illustrated in FIG. 9 when a load current is 0 A.
Figure 11:
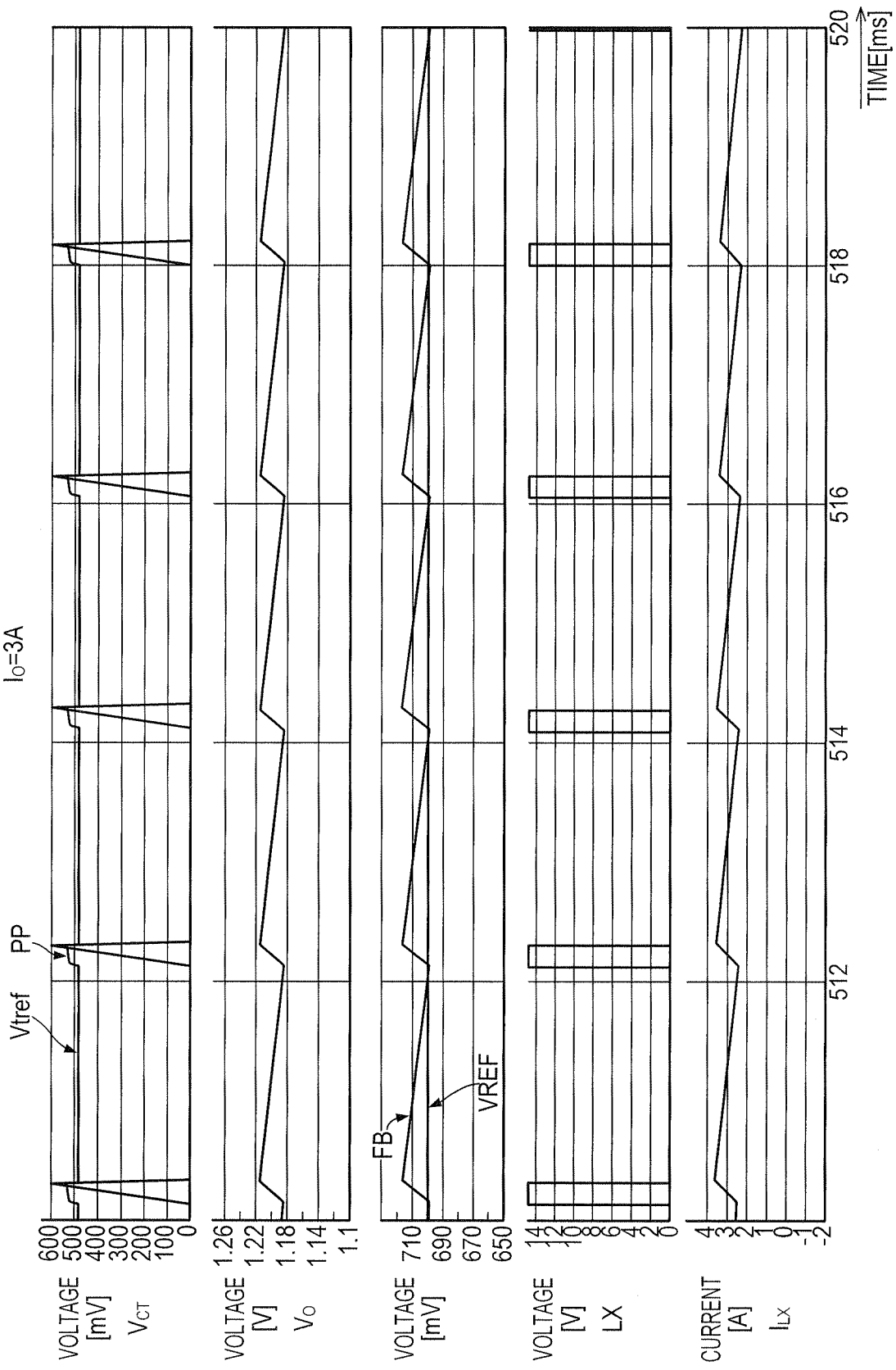
FIG. 11 illustrates the enlarged simulation waveforms illustrated in FIG. 9 when a load current is 3 A.

FIG. 9 illustrates an example of simulation waveforms of the power supply device according to the first embodiment. FIGS. 10 and 11 illustrate waveforms obtained by partially enlarging the simulation waveforms in FIG. 9. FIG. 10 illustrates a state when a load current Io in the simulation waveforms illustrated in FIG. 9 is 0 A (an unloaded state). FIG. 11 illustrates a state when a load current Io in the simulation waveforms illustrated in FIG. 9 is 3 A (a loaded state).

As illustrated in FIG. 9, when a load current Io that flows through a load resistance Ro is changed from Io=0 A to Io=3 A, each waveform illustrated in FIG. 10 changes into the corresponding waveform illustrated in FIG. 11 after going through a transient state.

In FIGS. 9 to 11, each waveform indicates, from the top, input voltage $V_{CT}$ and Vtref, output voltage Vo of the comparator 27 illustrated in FIG. 8 with input voltage FB and VREF of the error comparator 1 illustrated in FIG. 1, voltage of a node LX, and coil current $I_{LX}$.

As indicated by the reference numeral PP in FIGS. 9 and 11, a waveform of a voltage Vtref that is compared with the voltage $V_{CT}$ at the comparator 27 is raised to the high-potential side under a loaded state in order to control the t on period "t on 3 A" to become longer than the t on period "t on 0 A" under an unloaded state.

Figure 12:
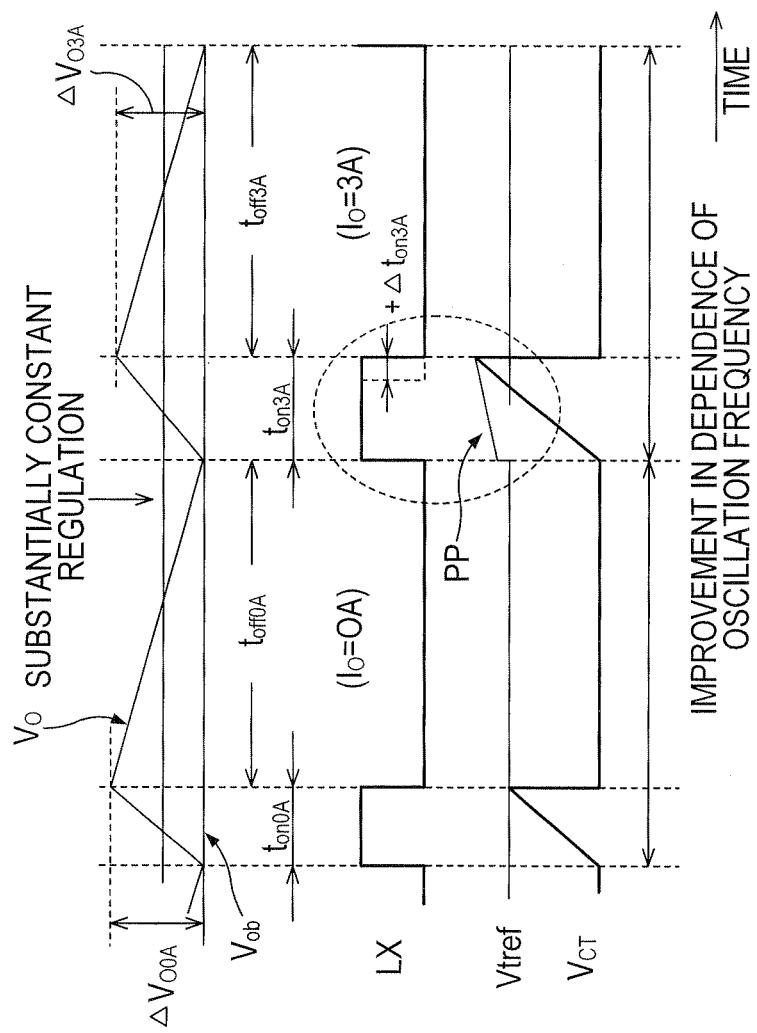
FIG. 12 illustrates an operation of the power supply device according to the first embodiment.

FIG. 12 illustrates an operation of the power supply device according to the first embodiment. FIG. 12 is obtained by combining FIG. 10 and FIG. 11 except for the transient state in FIG. 9 for simplification.

As illustrated in FIG. 12, the lowest voltage of the output voltage Vo is assumed to be a voltage Vob. The voltage Vob corresponding to a voltage FB, which is obtained by dividing an output voltage Vo at resistors R1 and R2 for comparison by the error comparator 1, becomes a reference voltage VREF. The output voltage Vo rises for a given "t on" period, and drops for a given "t off" period to the lowest voltage Vob.

In the first embodiment, the current detection circuit 8 provided between the source of the transistor 51 and a node LX substantially detects a coil current $I_{LX}$. The adder 28 in FIG. 8 adds an output signal Vs that corresponds to the coil current $I_{LX}$ and a voltage obtained by dividing a voltage Vo at the resistors R51 and R52, and generates the voltage Vtref.

Thus, a waveform of the voltage Vtref that is compared with the voltage $V_{CT}$ by the comparator 27 is raised (PP) to the high potential side under a loaded state of, for example, Io=3 A.

As a result, the t on period "t on$_{3A}$" under a loaded state becomes longer than "t on$_{0A}$" under an unloaded state of Io=0 A for a length of Δt on$_{3A}$. The Δt on$_{3A}$ changes with a signal Vs added by the adder 28. Thus, the larger a current ($I_{LX}$) detected by the current detection circuit 8 becomes, the larger the value of Δt on$_{3A}$ becomes.

The time "T on" during the t on period is represented by the following expression, where $I_{LX}$ is a current detected by the current detection circuit 8 (coil current $I_{LX}$), Rs is the resistor Rs between a signal line that supplies the signal Vs and the grounding wire GND, $V_{IN}$ is the power supply voltage, and Vo is the output voltage. "β" indicates a constant.

$$Ton=\{(Vo+I_{LX}\times R_s)/V_{IN}\}\times R_t\times \beta$$

As described above, the power supply device according to the first embodiment, the output voltage ripple ΔVo$_{0A}$ under an unloaded state and the output voltage ripple ΔVo$_{3A}$ under a loaded state become substantially the same level by adjusting the "t on" period according to the current level detected by the current detection circuit 8. The "t on" period may be adjusted by monitoring the load current Io instead of the coil current $I_{LX}$.

As a result, the average output voltage ripple ΔVo$_{0A}$ under an unloaded state and the average output voltage ripple ΔVo$_{3A}$ under a loaded state becomes substantially the same, and regulation may be maintained substantially constant regardless of the size of the output load.

Furthermore, an oscillation frequency of the power supply device may be maintained substantially constant by removing the influence of the output load. As described above, making an oscillation frequency of the power supply device substantially constant improves design flexibility for noise measures, such as avoiding interference with a frequency of a circuit (for example, clock frequency) to which the power supply device is applied.

Figure 13:
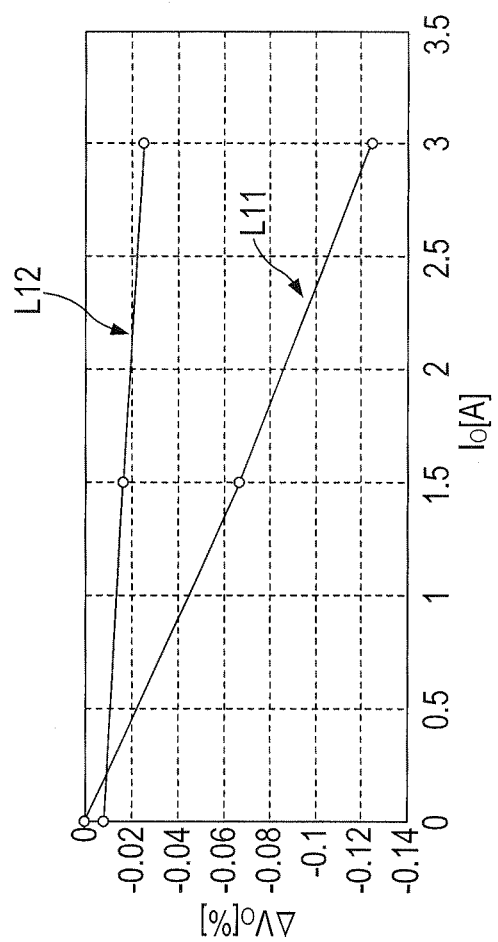
FIG. 13 illustrates an operation of the power supply device according to the first embodiment in comparison with the operation of the power supply device illustrated in FIG. 1 (load regulation)
Figure 14:
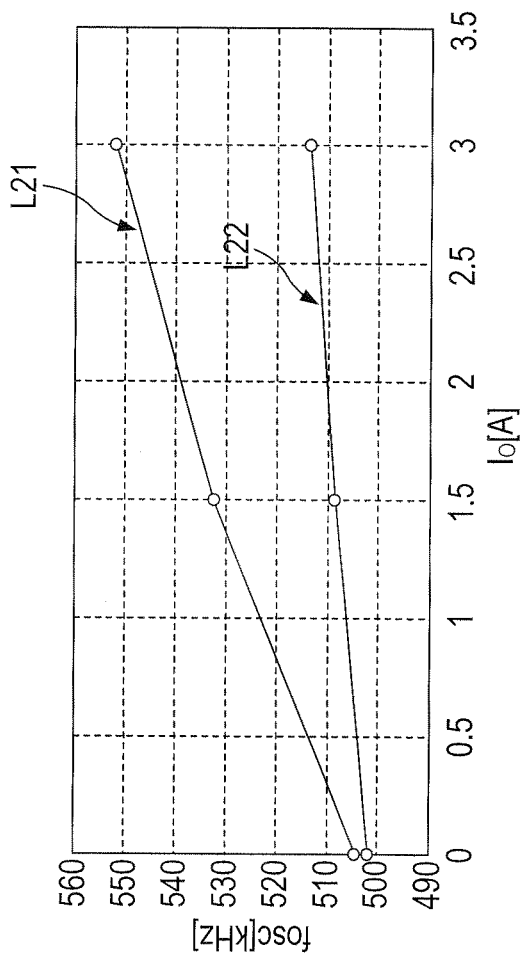
FIG. 14 illustrates an operation of the power supply device according to the first embodiment in comparison with that of the power supply device illustrated in FIG. 1 (load current (output load) dependence of oscillation frequency)

FIGS. 13 and 14 illustrate an operation of a power supply device according to the first embodiment in comparison with the operation of the power supply device illustrated in FIG. 1. FIG. 13 illustrates load regulation, while FIG. 14 illustrates load current (output load) dependence of oscillation frequency. In FIG. 13, the vertical axis indicates the output voltage ripple ΔVo [%], while the horizontal axis indicates the load current to [A]. In FIG. 14, the vertical axis indicates an oscillation frequency fosc [KHz], while the horizontal axis indicates the load current Io [A].

In FIGS. 13 and 14, the characteristic curves L11 and L21 are generated by the power supply device illustrated in FIG. 1, while the characteristic curves L12 and L22 are generated by the power supply device according to the first embodiment.

As illustrated in the characteristic curve L11 in FIG. 13, the load regulation of the power supply device illustrated in FIG. 1 degrades as the output voltage ripple ΔVo increases with increase in the load current Io.

For example, in the power supply device illustrated in FIG. 1, ΔVo is larger than −0.02, for example, when Io=0 A, whereas ΔVo is smaller than −0.14, for example, when Io=3 A, and the load regulation is degraded.

On the other hand, as illustrated in the characteristic curve L12 in FIG. 13, the output voltage ripple ΔVo does not substantially change even if the load current Io increases, thus the load regulation of the power supply device according to the first embodiment degrades very little.

For example, in the power supply device according to the first embodiment, ΔVo is larger than −0.02, for example, when Io=0 A, whereas ΔVo is slightly lower than −0.02 even if Io=3 A, thus the load regulation degrades only slightly.

Moreover, as indicated by the characteristic curve L21 in FIG. 14, the oscillation frequency fosc of the power supply device in FIG. 1 substantially changes with an increase in the load current Io.

For example, in the power supply device in FIG. 1, the oscillation frequency fosc is approximately 504 KHz when Io=0 A, whereas the oscillation frequency fosc becomes approximately 552 KHz when Io=3 A. The oscillation frequency fosc is changed for the amount of approximately 48 KHz.

On the other hand, as illustrated in the characteristic curve L22 in FIG. 14, the oscillation frequency f osc of the power supply device according to the first embodiment does not substantially change even if the load current Io increases.

For example, in the power supply device according to the first embodiment, the oscillation frequency fosc is approximately 502 KHz when Io=0 A, whereas the oscillation frequency fosc becomes approximately 513 KHz when Io=3 A. The change in the oscillation frequency fosc is approximately 11 KHz and is approximately ¼ smaller than the change in the oscillation frequency fosc of the power supply device illustrated in FIG. 1.

The above described effects of the load regulation are not limited to the DC-DC converter utilizing a bottom detection comparator method but may be exhibited in various power supply devices that utilize a ripple voltage, which will be described hereunder.

Moreover, an effect that reduces a change in oscillation frequency of the power supply device is exhibited by the power supply device that does not use a ripple voltage, which will be described later.

Figure 15:
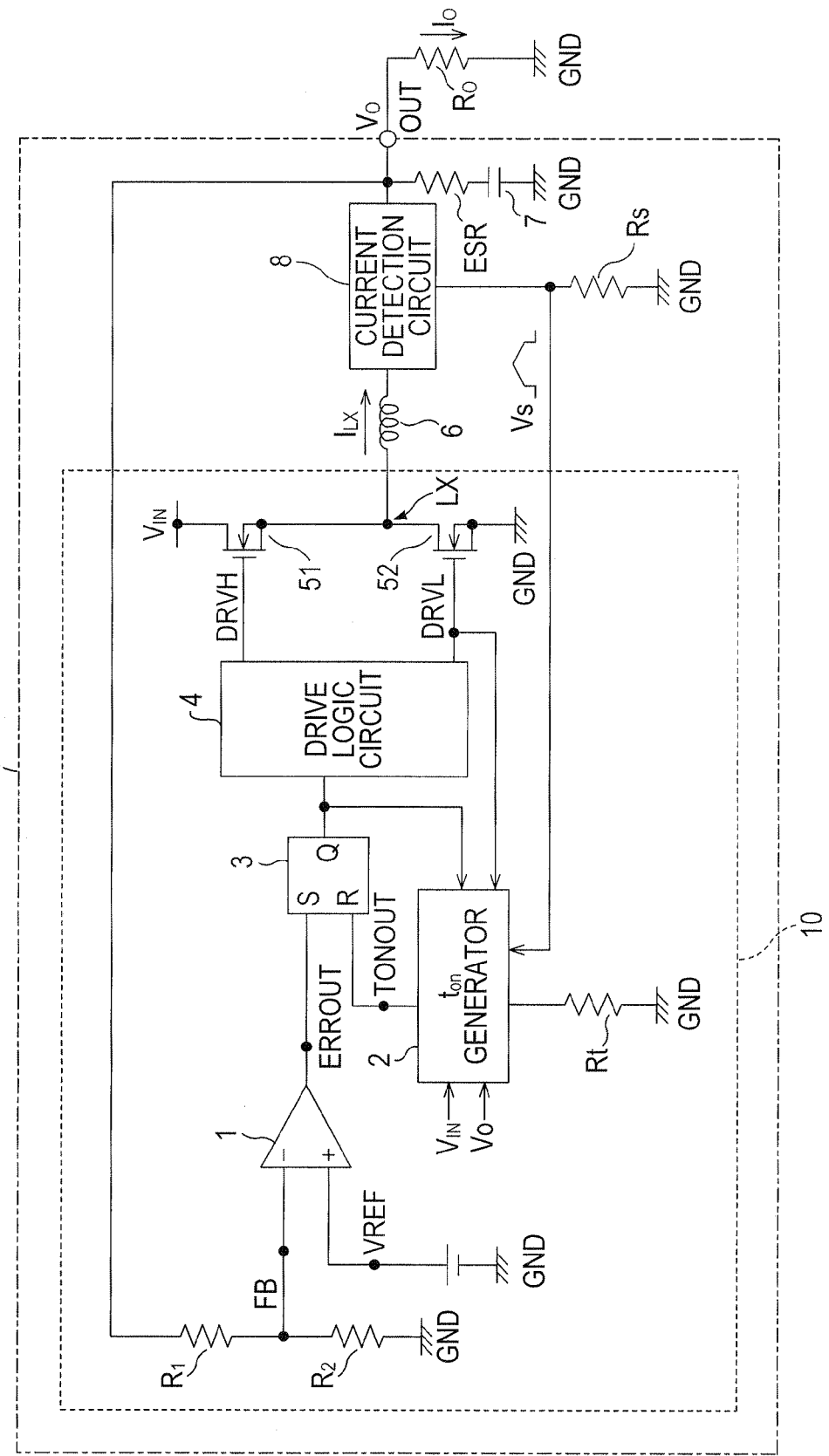
FIG. 15 is a block diagram schematically illustrating a power supply device according to a second embodiment.

FIG. 15 is a block diagram schematically illustrating a power supply device according to a second embodiment.

As may be seen from the comparison of FIG. 15 and FIG. 7, according to the second embodiment, a current detection circuit 8 is provided between a coil 6 and an output terminal OUT to detect the coil current $I_{LX}$ instead of providing the current detection circuit 8 between the source of the transistor 51 and the node LX.

In the second embodiment, the coil 6 is typically provided as an external element of the semiconductor integrated circuit 10, thus the current detection circuit 8 may be provided outside of the semiconductor integrated circuit 10 or, if the current detection circuit 8 is provided inside of the semiconductor integrated circuit 10, a connection pin may be included for the connection.

As may be seen from the comparison of FIG. 7 and FIG. 15, depending on a position where the current detection circuit 8 is provided, a waveform (shape) of a signal Vs supplied from the current detection circuit 8 to a $t_{on}$ generator 2 may differ; however, the operation of the $t_{on}$ generator 2 is substantially the same.

Figure 16:
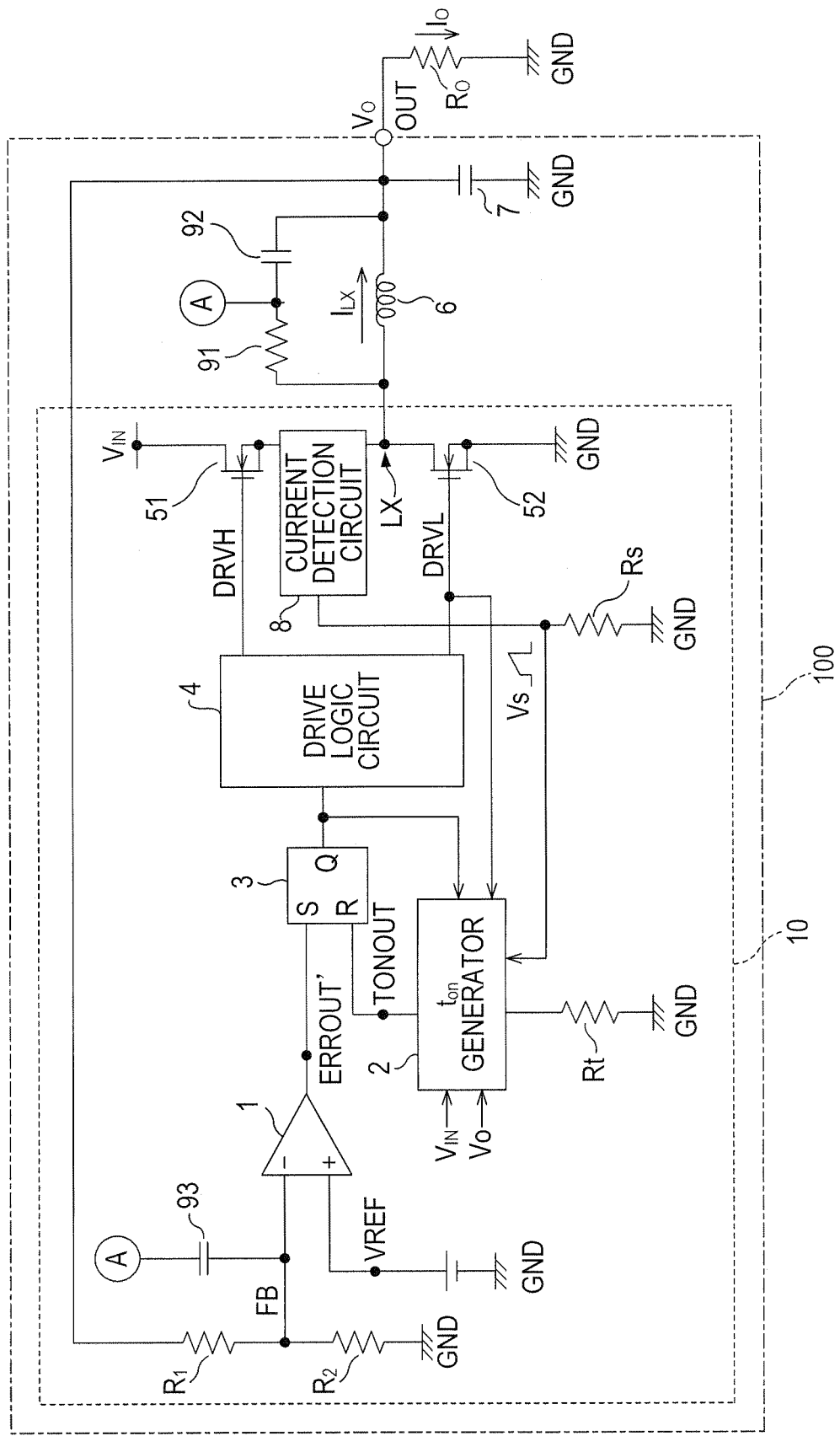
FIG. 16 is a block diagram schematically illustrating a power supply device according to a third embodiment.
Figure 17:
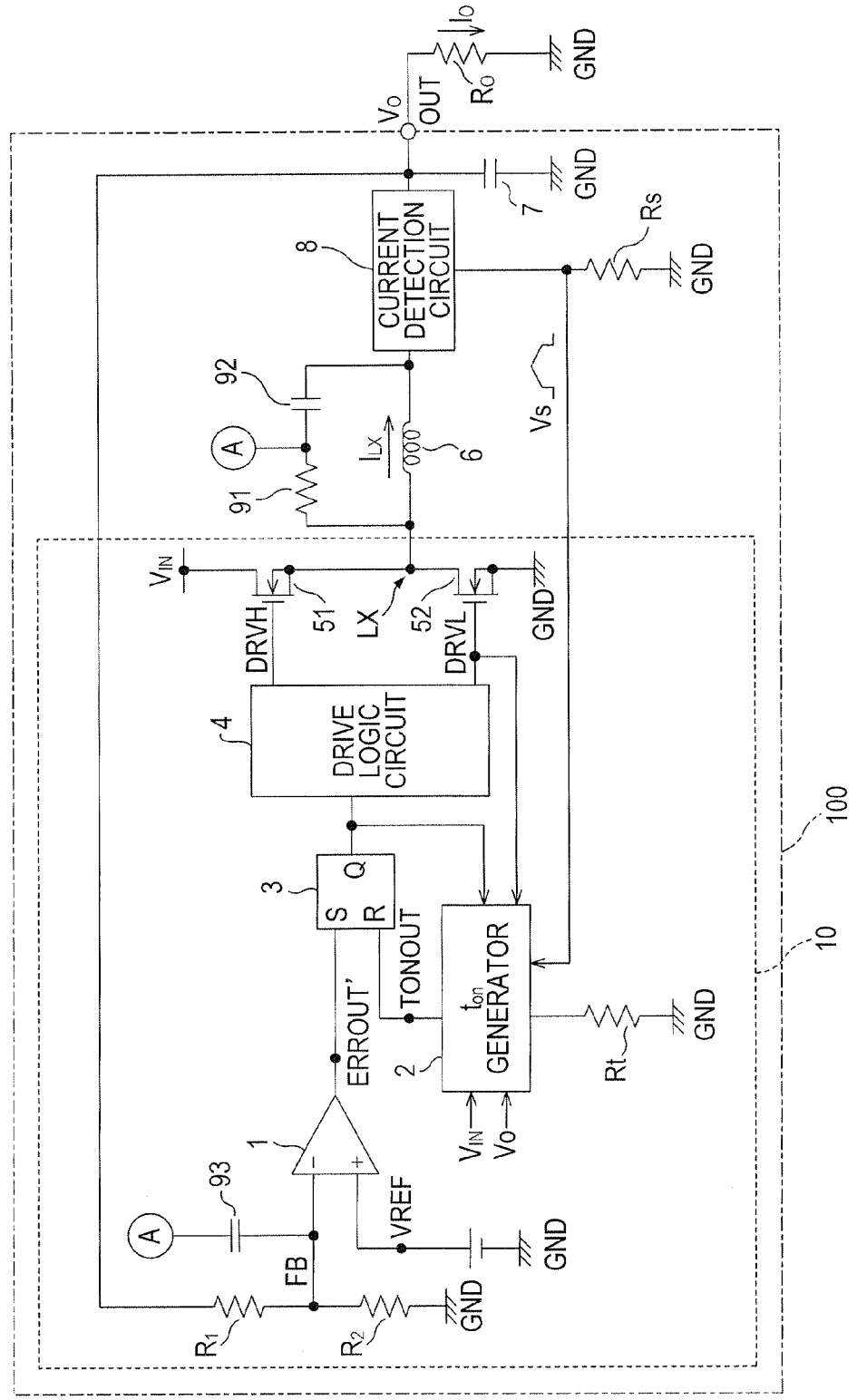
FIG. 17 is a block diagram schematically illustrating a power supply device according to a fourth embodiment.

FIG. 16 is a block diagram schematically illustrating a power supply device according to a third embodiment. FIG. 17 is a block diagram schematically illustrating a power supply device according to a fourth embodiment.

In the third and the fourth embodiments illustrated in FIGS. 16 and 17 respectively, a ripple is generated by using a coil 6, a resistor 91, and capacitors 92 and 93 instead of using a ripple voltage of an output voltage Vo by the resistance (parasitic resistance) ESR in the above described first and the second embodiments.

Serially coupled resistor 91 and capacitor 92 are coupled to both ends of the coil 6 respectively, and a connection node (A) of the resistor 91 and the capacitor 92 is coupled to one of the terminals of a comparator 1 to which a voltage FB is input.

In other words, according to the third and the fourth embodiments, a low resistance ESR capacitor is used as a smoothing capacitor 7 and a high-pass filter is configured with the resistor 91, the capacitor 92, and the coil 6 between the node LX and the output terminal OUT.

Capacitive coupling by the capacitor 93 provides a ripple to the voltage FB and causes an output signal ERROUT', to which a ripple component is superimposed, to be output from the comparator 1.

As may be seen from the comparison of FIG. 16 and FIG. 7, according to the third embodiment, in a power supply device that does not use resistance ESR, the current detection circuit 8 is provided between a source of a transistor 51 and a node LX as in the first embodiment.

As may be seen from the comparison of FIG. 17 and FIG. 15, according to the fourth embodiment, in a power supply device that does not use resistance ESR, the current detection circuit 8 is provided between a coil 6 and an output terminal OUT as in the second embodiment.

The switching transistors 51 and 52 may be provided outside of the semiconductor integrated circuit 10. The same applies to each embodiment that will be described hereunder.

Figure 18:
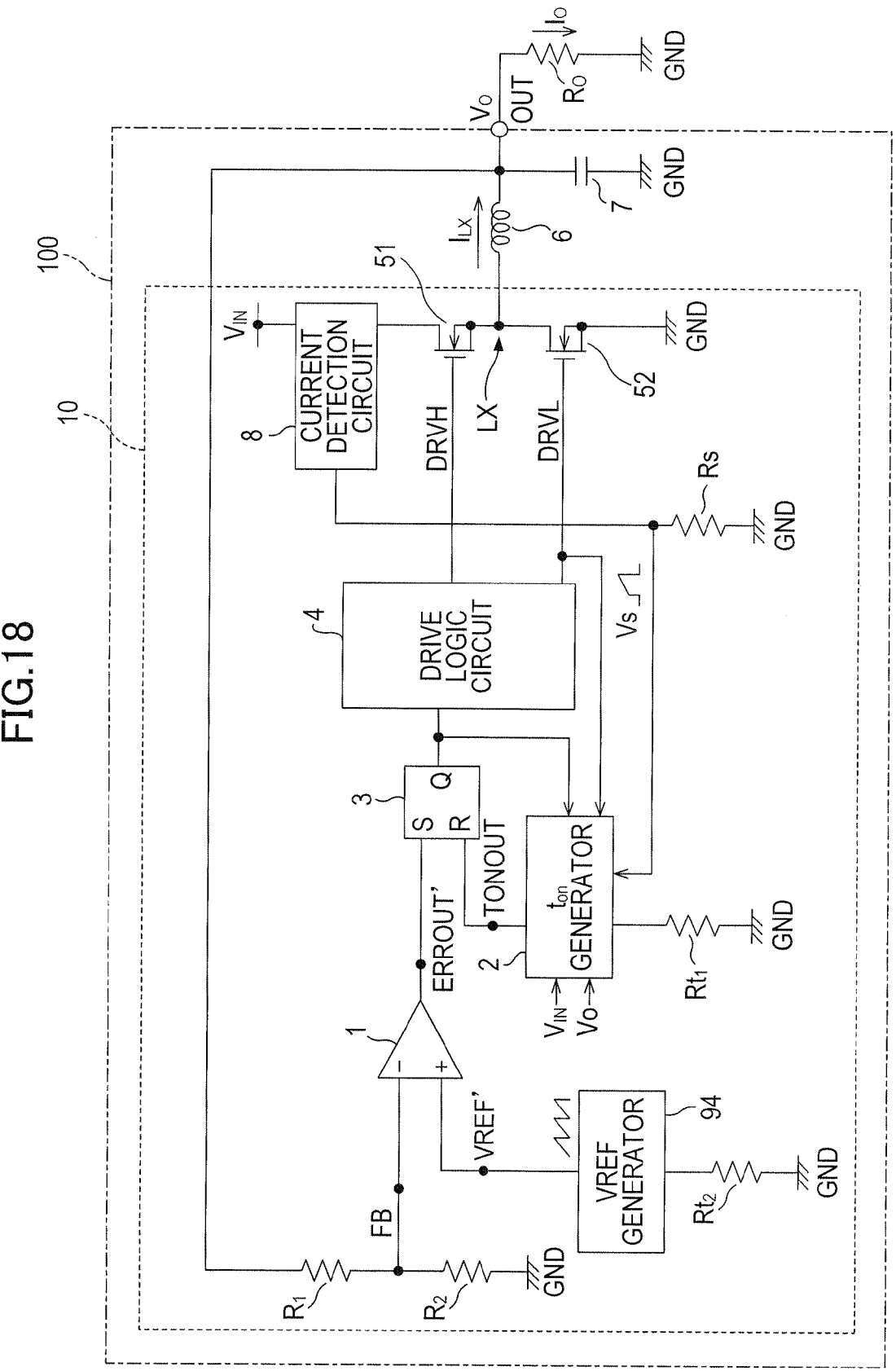
FIG. 18 is a block diagram schematically illustrating a power supply device according to a fifth embodiment.
Figure 19:
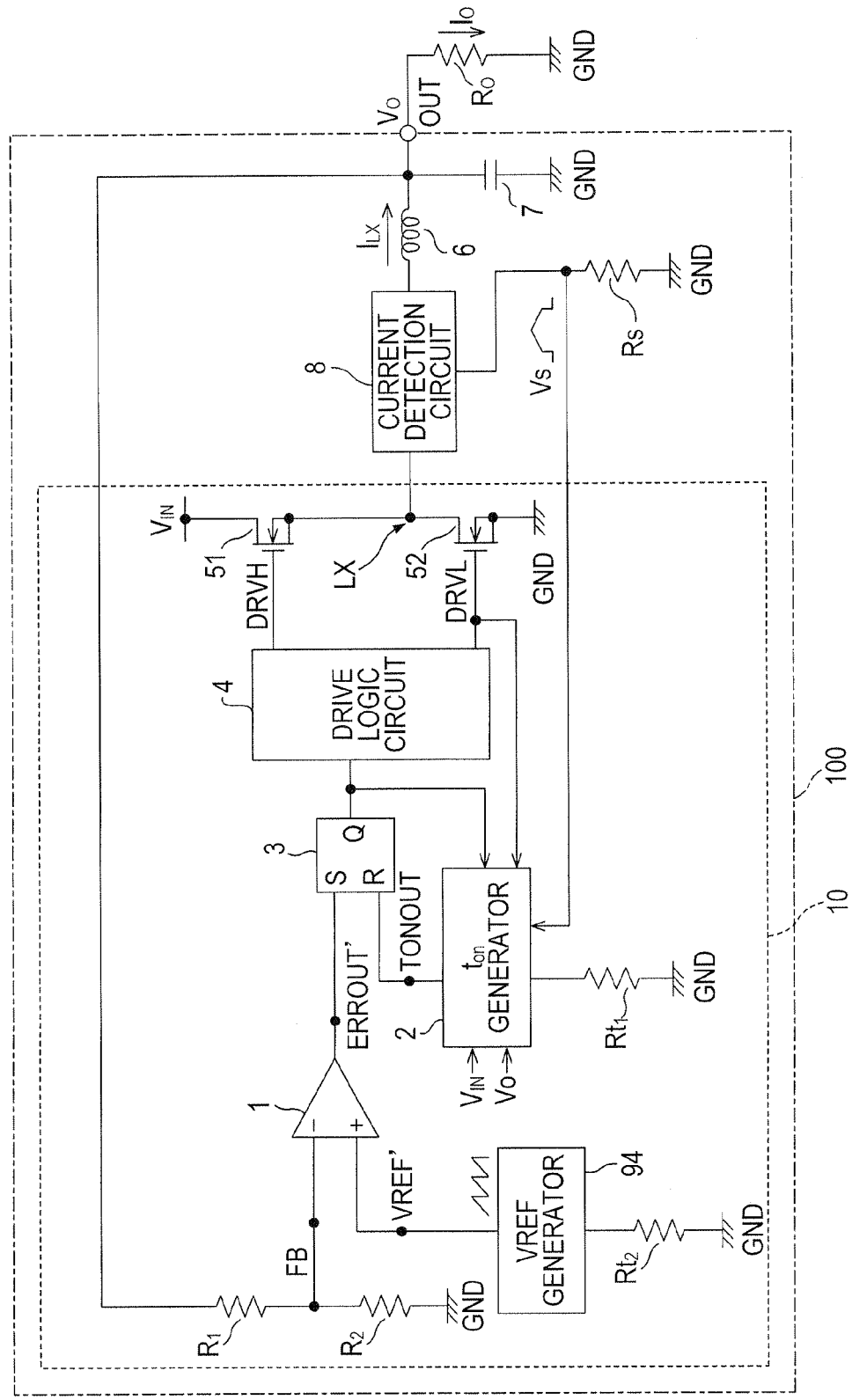
FIG. 19 is a block diagram schematically illustrating a power supply device according to a sixth embodiment.

FIG. 18 is a block diagram schematically illustrating a power supply device according to a fifth embodiment. FIG. 19 is a block diagram schematically illustrating a power supply device according to a sixth embodiment.

The fifth and sixth embodiments illustrated in FIGS. 18 and 19 respectively do not use a ripple voltage of an output voltage Vo due to the resistance ESR. Instead, the fifth and sixth embodiments use a reference voltage VREF' that is compared with a voltage FB by the comparator 1 as an output signal of the VREF generator 94.

A resistor $R_{r1}$ is provided between the $t_{on}$ generator 2 and the grounding wire GND. A resistor $R_{r2}$ is provided between the VREF generator 94 and a grounding wire GND. A low resistance ESR capacitor is used as a smoothing capacitor 7.

The VREF generator 94 generates a voltage signal in a saw tooth waveform. The comparator 1 compares the reference voltage VREF' in a ripple waveform that changes with time with a voltage FB and outputs a signal ERROUT' to which the ripple component is superimposed.

As illustrated in FIG. 18, according to the fifth embodiment, in the power supply device without a resistance ESR, the current detection circuit 8 is provided between a high-potential power line to which a power supply voltage $V_{IN}$ is applied and a drain of the transistor 51.

The current detection circuit 8 detects a current that corresponds to a coil current $I_{LX}$ when the current detection circuit 8 is provided between a high-potential power line and the drain of the transistor 51 as in when the current detection circuit 8 is provided between the source of the transistor 51 and the node LX.

As illustrated in FIG. 19, according to the sixth embodiment, in the power supply device without a resistance ESR, a current detection circuit 8 is provided between a node LX and a coil 6.

The current detection circuit 8 detects a current that corresponds to a coil current $I_{LX}$ when the current detection circuit 8 is provided between the node LX and the coil 6 as in when the current detection circuit 8 is provided between the coil 6 and an output terminal OUT.

Note that a position where the current detection circuit 8 is provided may be changed in other embodiments as well.

Figure 20:
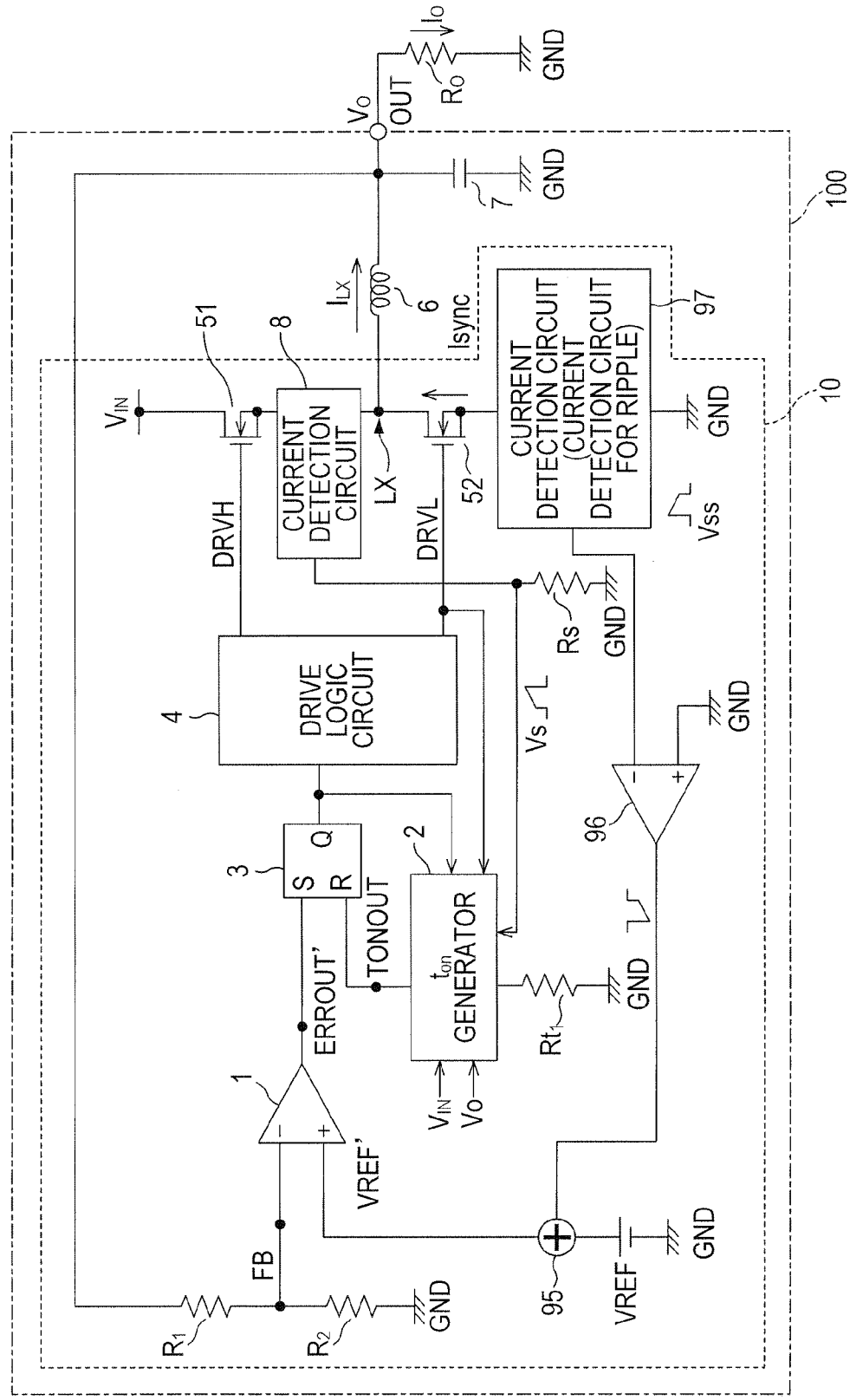
FIG. 20 is a block diagram schematically illustrating a power supply device according to a seventh embodiment.
Figure 21:
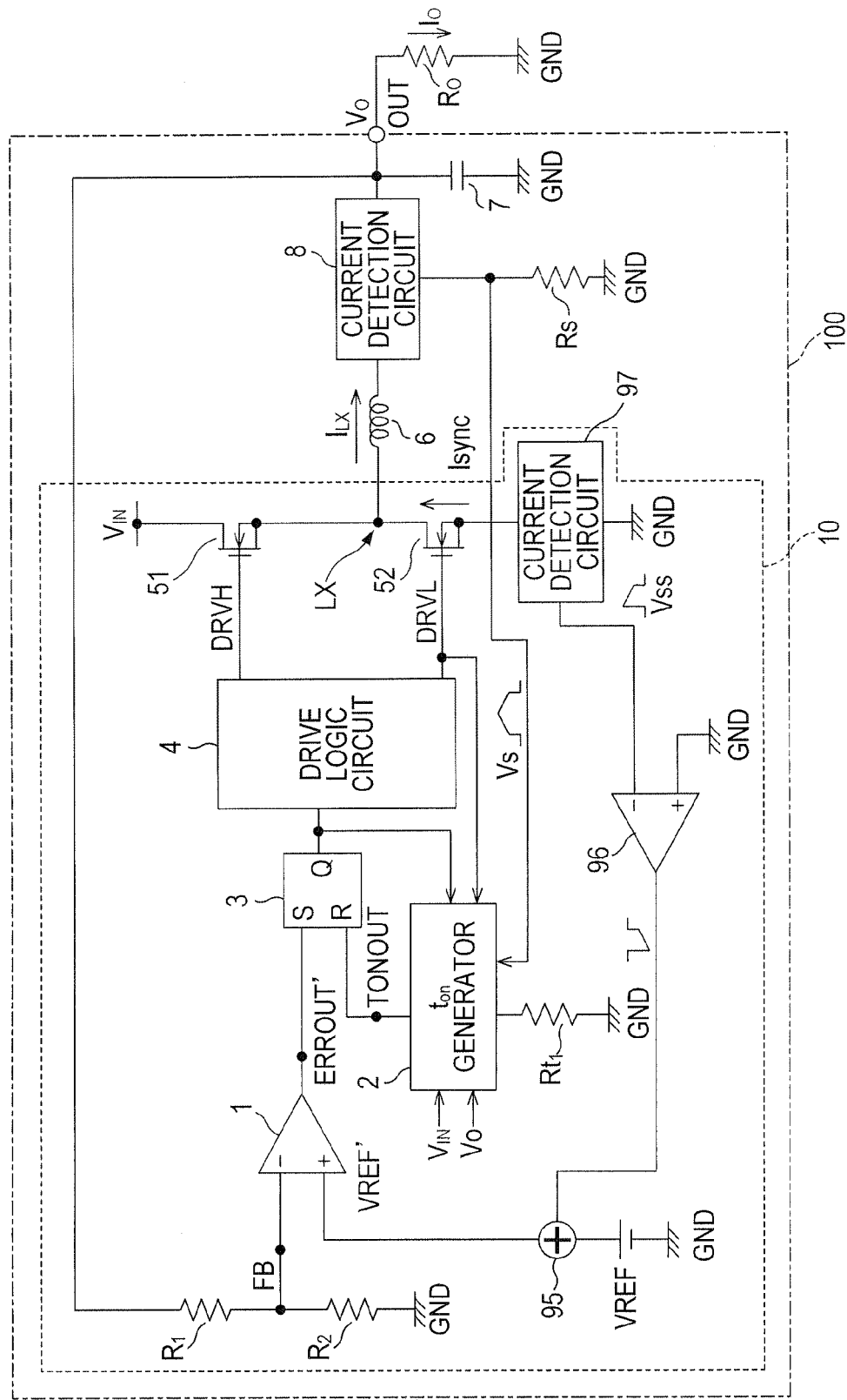
FIG. 21 is a block diagram schematically illustrating a power supply device according to an eighth embodiment.

FIG. 20 is a block diagram schematically illustrating a power supply device according to a seventh embodiment. FIG. 21 is a block diagram schematically illustrating a power supply device according to an eighth embodiment.

In the seventh and the eighth embodiments illustrated in FIGS. 20 and 21 respectively, an adder 95 adds an output signal of a current buffer 96 to a reference voltage VREF, and a comparator 1 compares a voltage FB with a reference voltage VREF' to which a ripple waveform is superimposed and generates an output signal ERROUT' to which a ripple component is superimposed.

A ripple waveform that is superimposed to the reference voltage VREF by the adder 95 is generated by supplying an output signal Vss of a current detection circuit (current detection circuit for a ripple) 97 provided between a source of a switching transistor 52 and a grounding wire GND to an inverting input (negative input) of a current buffer 96. A non-inverting input (positive input) of the current buffer 96 is coupled to a grounding wire GND.

The current detection circuit 97 detects a current Isync that flows when the transistor 52 is turned on. It is ensured that the transistor 51 is turned off while the transistor 52 is turned on, and the current I sync that flows through the transistor 52 becomes a coil current $I_{LX}$.

According to the seventh embodiment illustrated in FIG. 20, the current detection circuit 8 is provided between a source of the transistor 51 and a node LX. In the eighth embodiment illustrated in FIG. 21, the current detection circuit 8 is provided between a coil 6 and an output terminal OUT.

Figure 22:
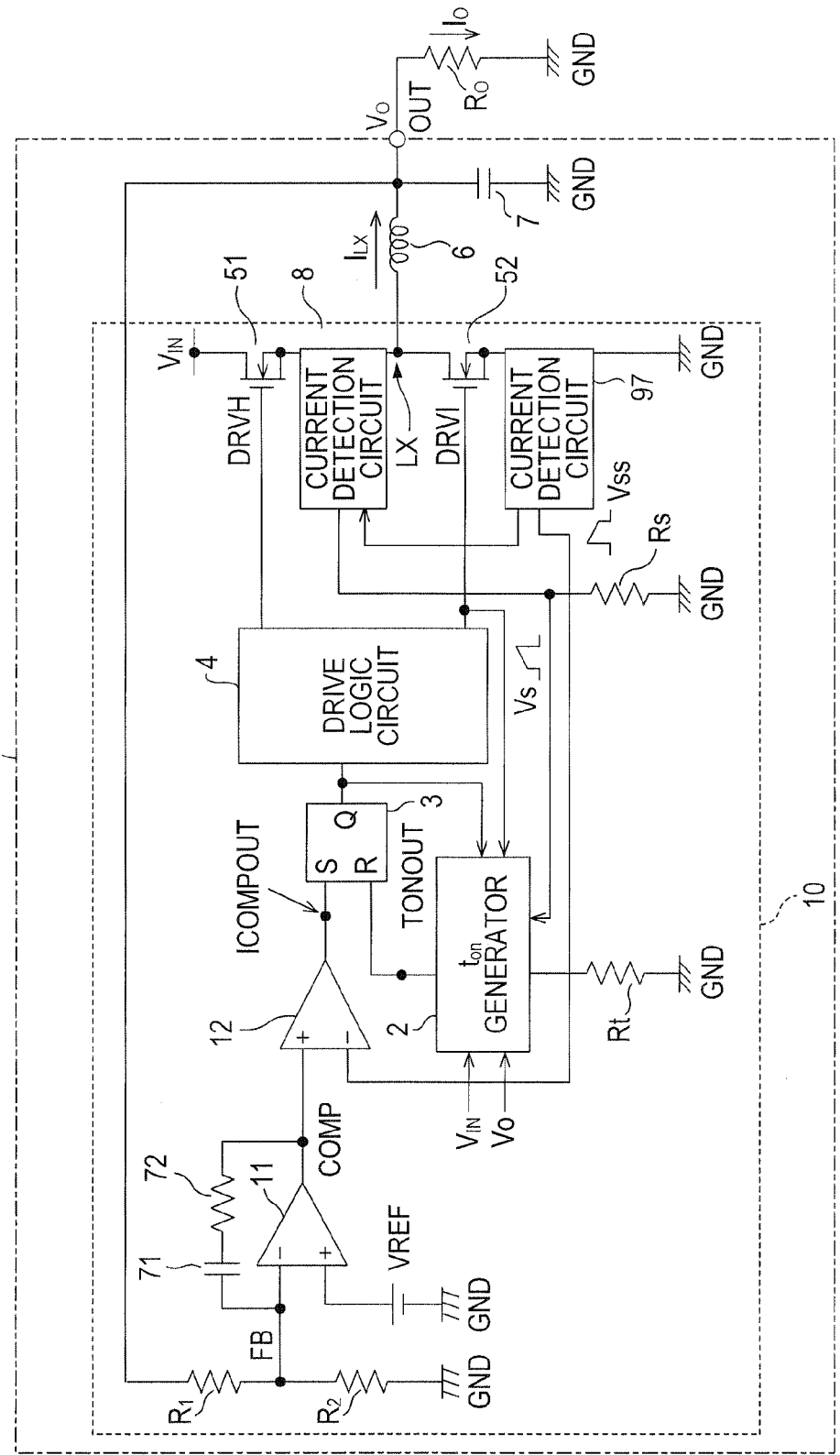
FIG. 22 is a block diagram schematically illustrating a power supply device according to a ninth embodiment.
Figure 23:
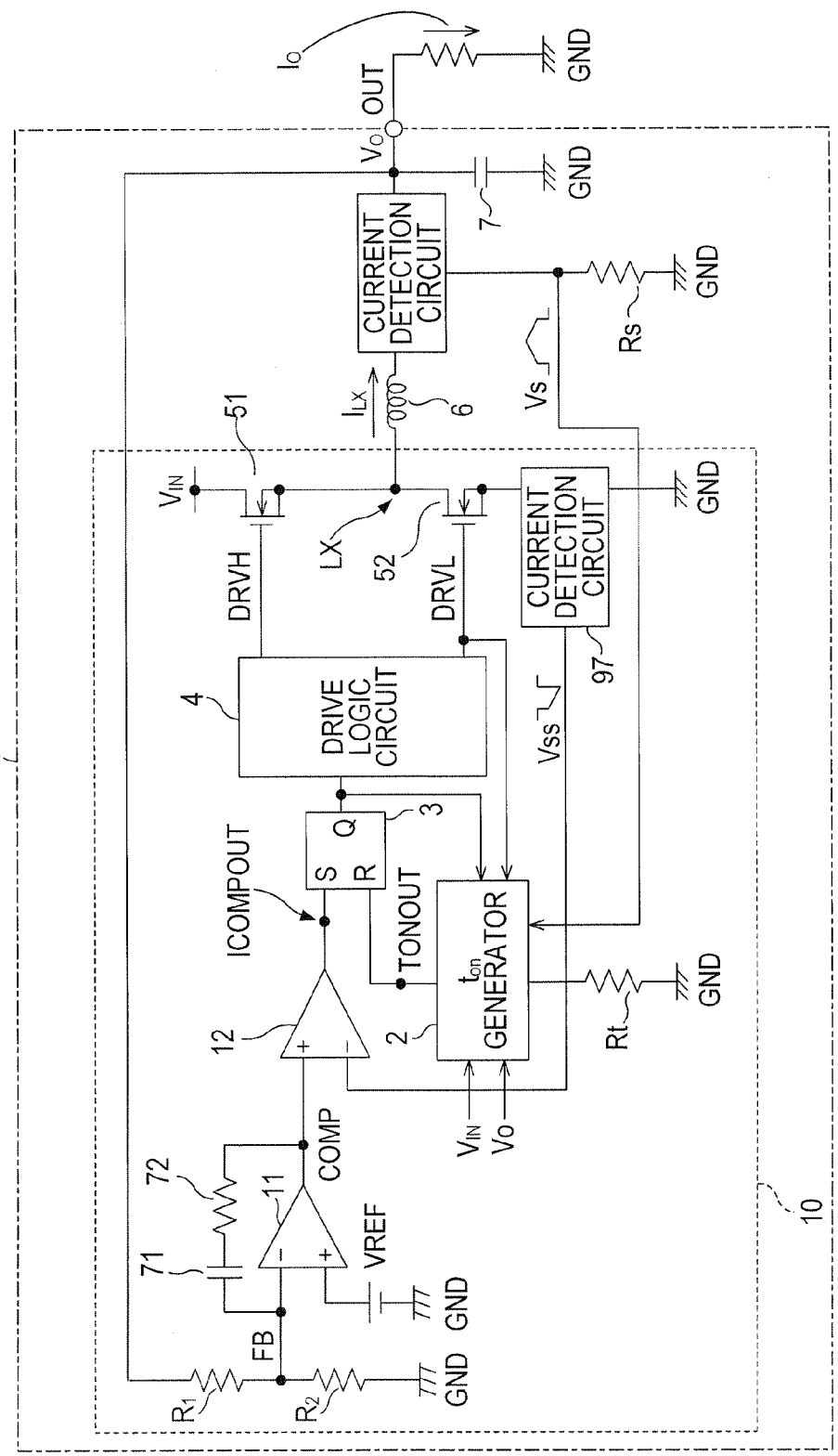
FIG. 23 is a block diagram schematically illustrating a power supply device according to a tenth embodiment.
Figure 24:
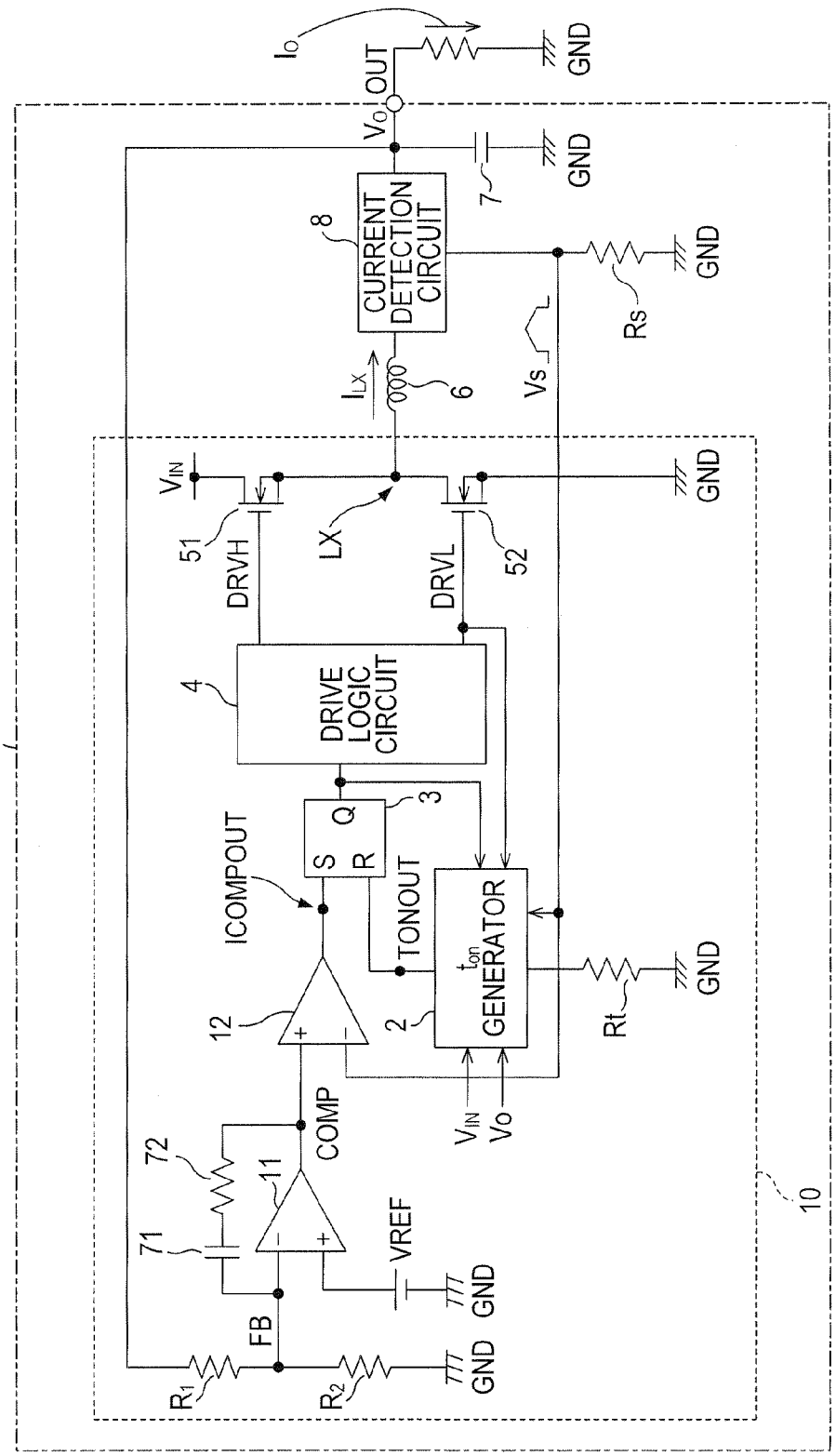
FIG. 24 is a block diagram schematically illustrating a power supply device according to an eleventh embodiment.

FIG. 22 is a block diagram schematically illustrating a power supply device according to a ninth embodiment. FIG. 23 is a block diagram schematically illustrating a power supply device according to a tenth embodiment. FIG. 24 is a block diagram schematically illustrating a power supply device according to an eleventh embodiment.

According to the above described embodiments, the error comparator 1 compares a voltage FB generated by feeding back an output voltage Vo with a reference voltage VREF (VREF'), and an output signal ERROUT (ERROUT') of the comparator 1 is input to a set terminal S of an RS flip flop 3.

However, according to the ninth to the eleventh embodiments illustrated in FIGS. 22 to 24, an error amplifier 11 converts a potential difference between a voltage FB and a reference voltage VREF into a signal COMP of DC voltage, and a comparator 12 compares the signal COMP with an output signal Vss (Vs) of the current detection circuit 97 (8).

An output signal ICOMPOUT of the comparator 12 is input to the set terminal S of the RS flip flop 3. Serially coupled capacitor 71 and resistor 72 are coupled between the input, to which the voltage FB of the error amplifier is supplied, and the output.

In the ninth and the tenth embodiments illustrated in FIGS. 22 and 23 respectively, the comparator 12 compares an output signal COMP of the error amplifier 11 with an output signal VSS of the current detection circuit 97 provided between a source of a switching transistor 52 and a grounding wire GND.

According to the eleventh embodiment illustrated in FIG. 24, the comparator 12 compares an output signal COMP of the error amplifier 11 with an output signal Vs of the current detection circuit 8 provided between the coil 6 and the output terminal OUT. In other words, an output signal Vs of the current detection circuit 8 is supplied not only to a $t_{on}$ generator 2 but also to the comparator 12.

According to the ninth embodiment illustrated in FIG. 22, the current detection circuit 8 is provided between the source of the transistor 51 and the node LX. According to the tenth embodiment illustrated in FIG. 23, a current detection circuit 8 is provided between a coil 6 and an output terminal OUT.

Moreover, according to the eleventh embodiment illustrated in FIG. 24, a current detection circuit 8 is provided between a coil 6 and an output terminal OUT, and supplies the output signal Vs to a $t_{on}$ generator 2 and a comparator 12.

As in the ninth to eleventh embodiments, a power supply device that does not use a ripple voltage may maintain an oscillation frequency substantially constant and may improve design flexibility for noise measures compared, for example, with a power supply device that provides a given frequency width.

In other words, noise measures are to be taken for all widths of the oscillation frequencies when an oscillation frequency of the power supply device changes depending on the size of the output load current. Thus, various limitations and cost may be increased due to noise measures. However, using the power supply device that does not use a ripple voltage enables the reduction of limitations and cost.

FIGS. 25 to 29 are block diagrams schematically illustrating the power supply devices according to twelfth to sixteenth embodiments respectively. The power supply device (DC-DC converter) allows switching among a buck converter, a boost converter, and a buck-boost converter.

The buck converter is a DC-DC converter that generates an output voltage Vo (average output voltage) lower than a power supply voltage $V_{IN}$ (input voltage). The boost converter is a DC-DC converter that generates an output voltage Vo higher than the power supply voltage $V_{IN}$.

Moreover, the buck-boost converter generates a negative output voltage/Vo from a positive power supply voltage $V_{IN}$. In other words, the buck-boost converter is a DC-DC converter that generates a negative output voltage relative to a grounding level of an input voltage.

In the twelfth to sixteenth embodiments, a drive logic circuit 4 controls four switching transistors 53 to 56 by instructing a mode control circuit 13 to a buck mode, a boost mode, or a buck-boost mode.

Switching transistors 53 and 54 correspond to the above described switching transistors 51 and 52. The switching transistors 55 and 56 correspond to the third and the fourth switching transistors.

Figure 25:
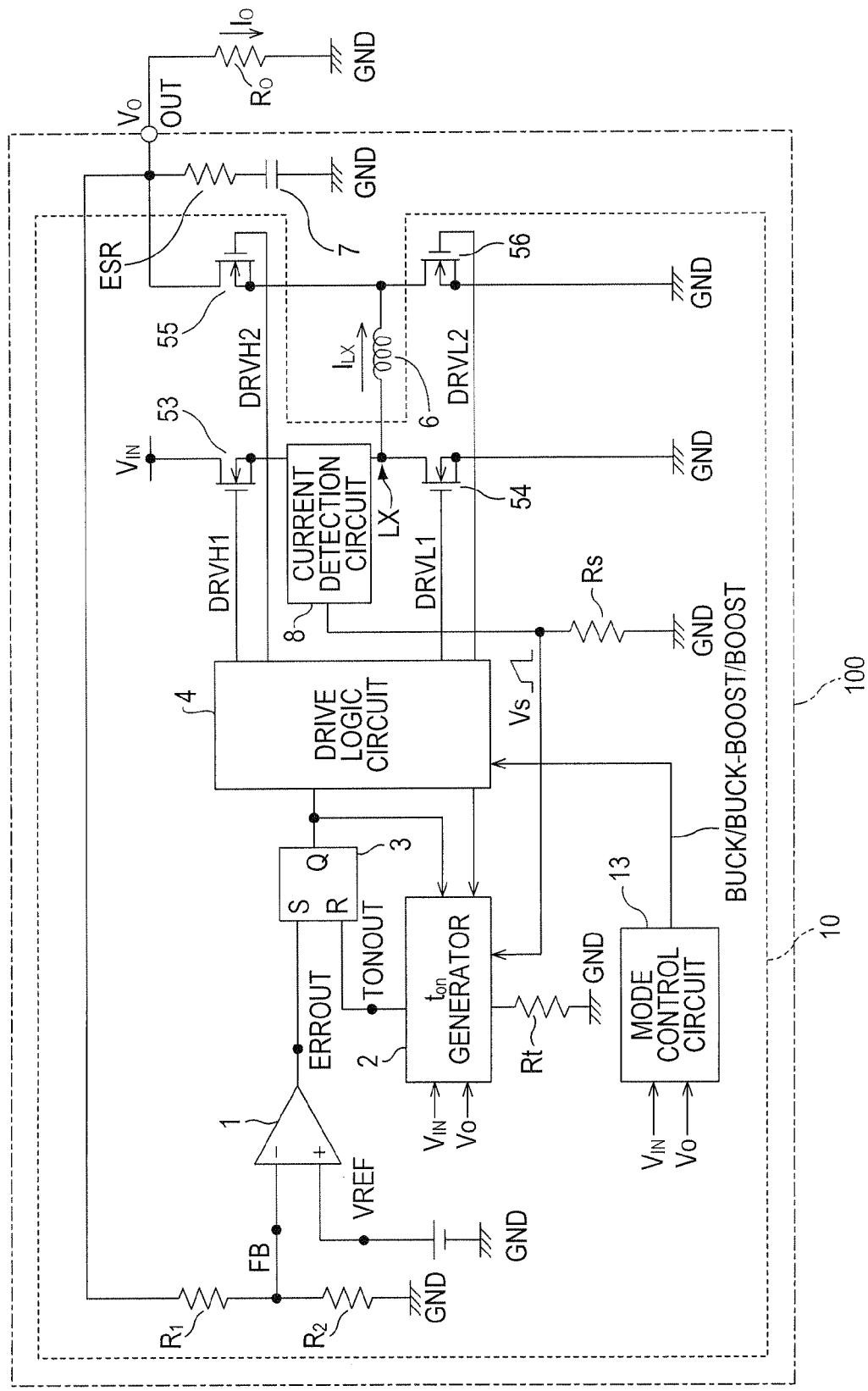
FIG. 25 is a block diagram schematically illustrating a power supply device according to a twelfth embodiment.

In the twelfth embodiment illustrated in FIG. 25, in a power supply device with a mode control function that superimposes a ripple by using resistance ESR (refer to the first embodiment), a power supply detection circuit 8 is provided between a source of a transistor 53 and a node LX.

Figure 26:
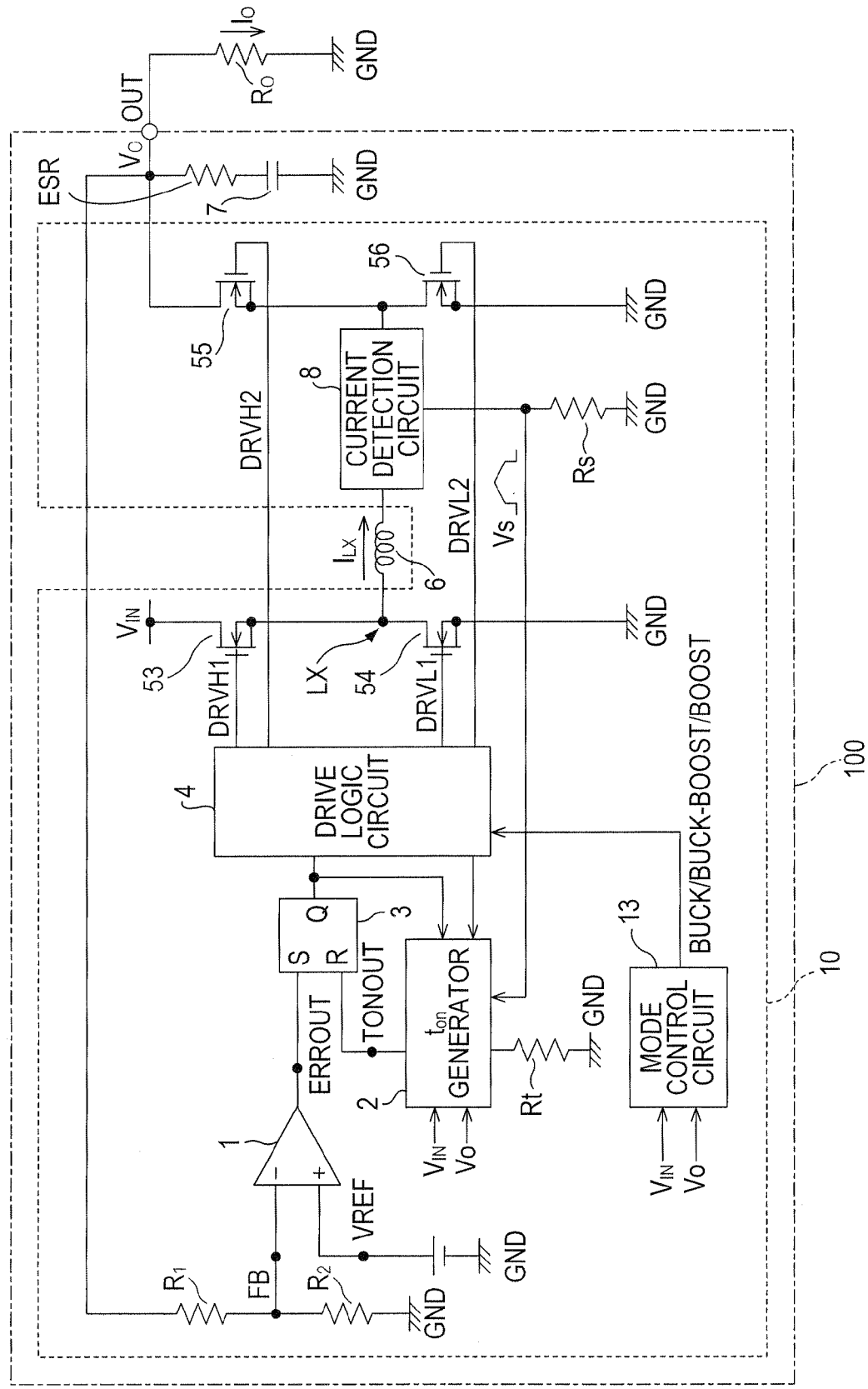
FIG. 26 is a block diagram schematically illustrating a power supply device according to a thirteenth embodiment.

In the thirteenth embodiment illustrated in FIG. 26, in a power supply device with a mode control function that superimposes a ripple component by using resistance ESR (refer to the second embodiment), a power supply detection circuit 8 is provided between a coil 6 and an output terminal OUT.

Figure 27:
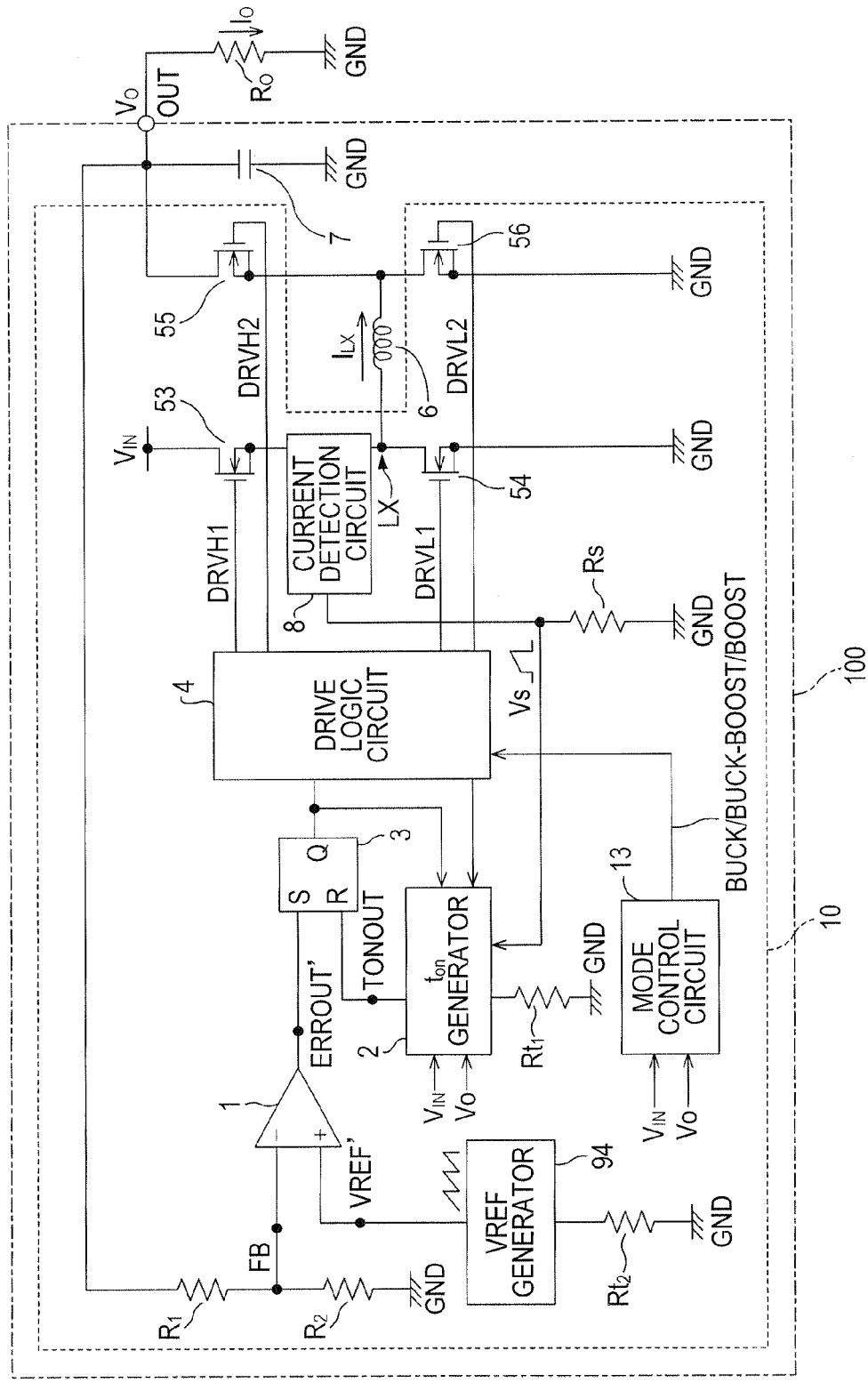
FIG. 27 is a block diagram schematically illustrating a power supply device according to a fourteenth embodiment.

Moreover, in the fourteenth embodiment illustrated in FIG. 27, in a power supply device with a mode control function that superimposes a ripple by using a VREF generator 94 (refer to the fifth embodiment), a power supply detection circuit 8 is provided between a source of a transistor 53 and a node LX.

Figure 28:
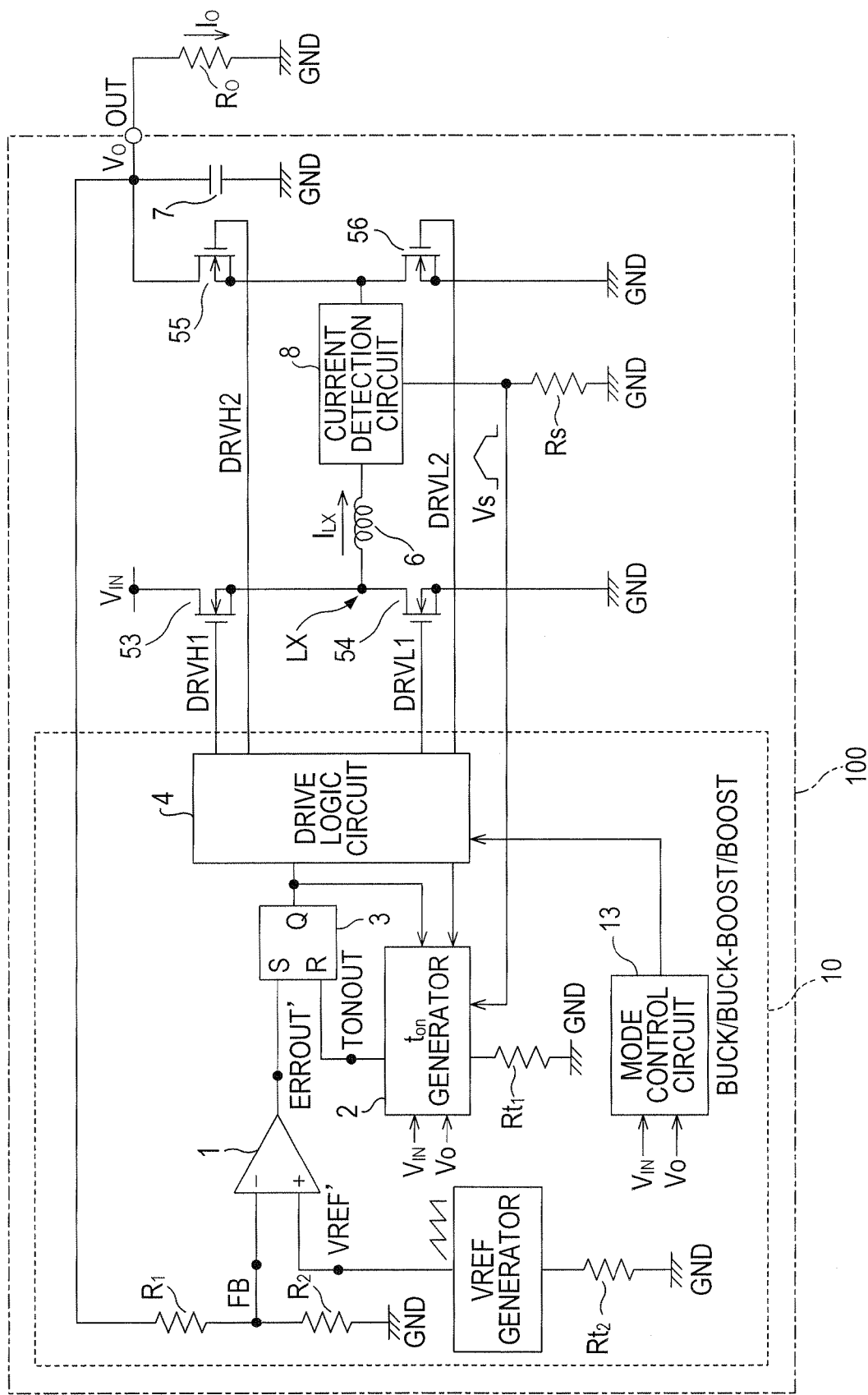
FIG. 28 is a block diagram schematically illustrating a power supply device according to a fifteenth embodiment.

In the fifteenth embodiment illustrated in FIG. 28, in a power supply device with a mode control function that superimposes a ripple by using a VREF generator 94 (refer to the sixth embodiment), a power supply detection circuit 8 is provided between a coil 6, and a connection node between transistors 55 and 56.

In the fifteenth embodiment illustrated in FIG. 28, a coil 6, a capacitor 7, switching transistors 53 to 56, and a current detection circuit 8 are provided outside of the semiconductor integrated circuit 10.

Figure 29:
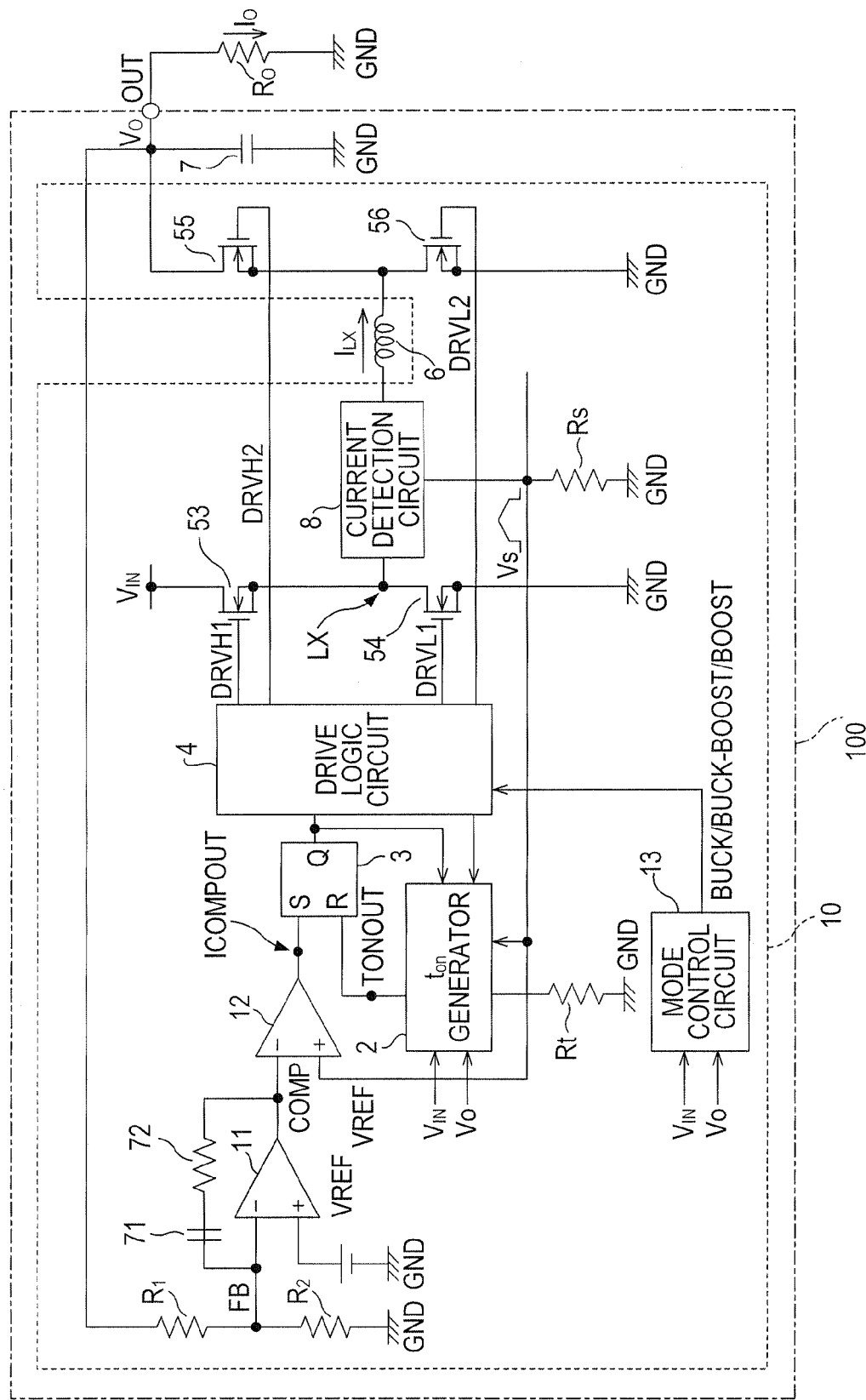
FIG. 29 is a block diagram schematically illustrating a power supply device according to a sixteenth embodiment.

Moreover, in the sixteenth embodiment illustrated in FIG. 29, in a power supply device with a mode control function that uses an error amplifier 11 (refer to the tenth embodiment), a power supply detection circuit 8 is provided between a node LX and a coil 6.

The current detection circuit 8 detects a coil current $I_{LX}$ when the current detection circuit 8 is provided between the node LX and the coil 6 as in when the current detection circuit 8 is provided between the coil 6 and the connection node of the transistors 55 and 56.

In the twelfth to sixteenth embodiments, a drive logic circuit 4 supplies an appropriate signal for a mode set by the mode control circuit 13 that controls on/off of a transistor 56, to the $t_{on}$ generator 2.

Figure 30:
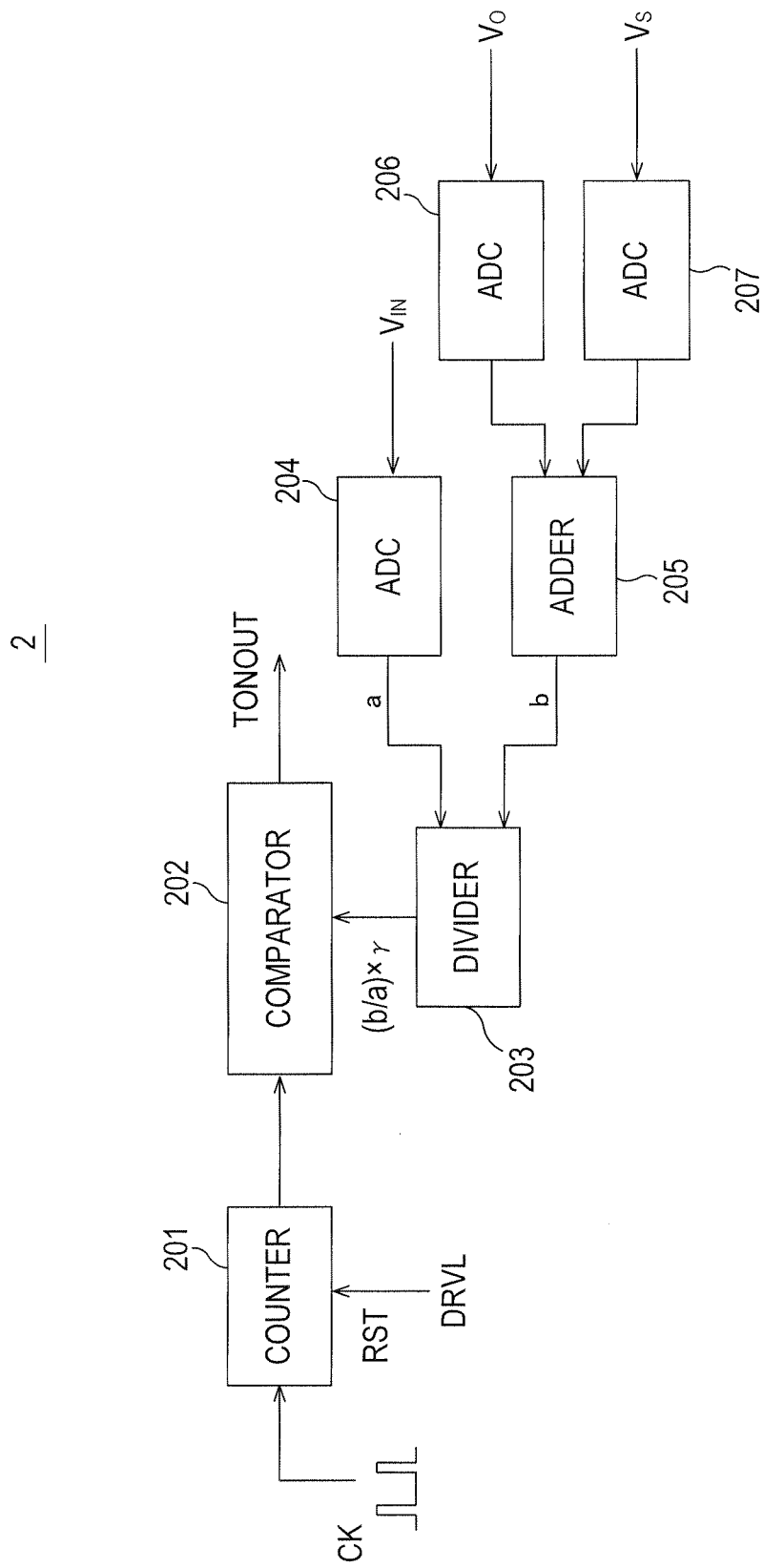
FIG. 30 is a block diagram illustrating an alternative embodiment of the $t_{on}$ generator illustrated in FIG. 8.

FIG. 30 is a block diagram illustrating an alternative embodiment of the $t_{on}$ generator illustrated in FIG. 8 in which the $t_{on}$ generator 2 is a digital circuit.

As illustrated in FIG. 30, the $t_{on}$ generator 2 includes a counter 201, a comparator 202, a divider 203, and analog to digital converters (ADC: A/C converters) 204 to 207.

The counter 201 counts a clock CK and is reset by a control signal DRVL of a transistor 52. The ADC 204 A/D-converts a power supply voltage $V_{IN}$. The ADC 205 converts 205 A/D-converts an output voltage Vo. The ADC 206 A/D-converts an output signal Vs of the power supply detection circuit 8.

The adder 205 adds the output signal Vs of the ADC 206 obtained by A/D-converting the output voltage Vo and the output signal of the ADC 207 obtained by A/D-converting the output signal Vs of the current detection circuit 8, and supplies the added signal as a signal "b" to the divider 203.

An output signal "a" of the ADC 204 which is obtained by A/D-converting a power supply voltage $V_{IN}$ is supplied to the divider 203 as well. The divider 203 outputs a signal of (b/a)×γ to the comparator 202. The γ indicates a constant.

The comparator 202 compares an output signal of the counter 201 with the signal (b/a)×γ, and outputs a signal TONOUT that is to be supplied to a reset terminal R of an RS flip flop 3.

The output of the signal TONOUT is delayed when a coil current $I_{LX}$ is large so that an on period "t on" lasts longer by taking account of variations in a current (coil current $I_{LX}$) detected by the current detection circuit 8.

As described above, the $t_{on}$ generator 2 is enabled by an analog circuit illustrated in FIG. 8 and a digital circuit illustrated in FIG. 30. The circuits illustrated in FIGS. 8 and 30 are just examples and various circuits may be applied.

Figure 31:
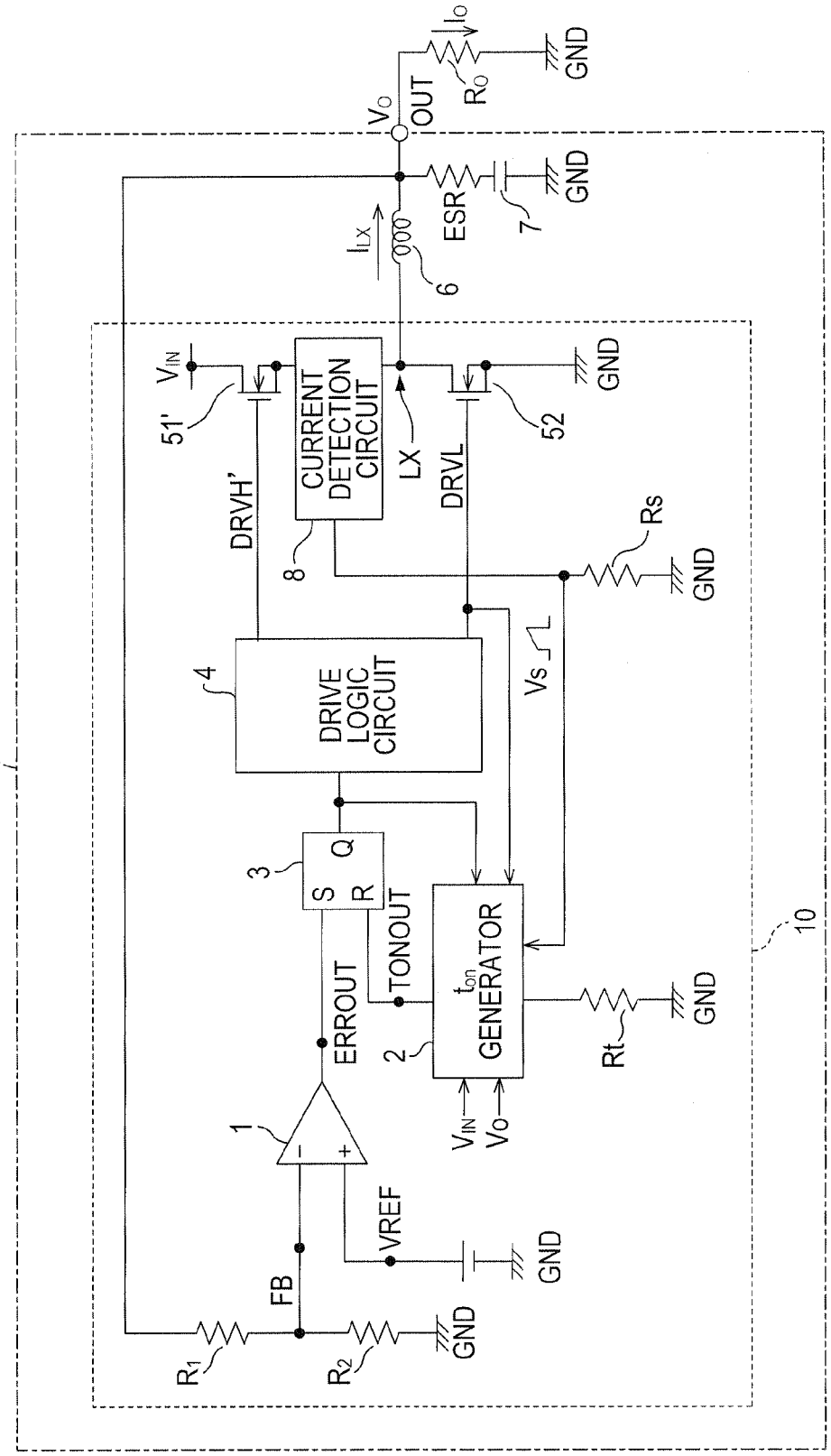
FIG. 31 is a block diagram schematically illustrating a power supply device according to a seventeenth embodiment.

FIG. 31 is a block diagram schematically illustrating a power supply device according to a seventeenth embodiment.

As may be seen from the comparison of FIG. 31 and FIG. 7, according to the seventeenth embodiment, a switching transistor that is coupled to a high-potential power line is a pMOS transistor 51' and the control signal is a signal DRVH', the logic of which is inverted.

As described above, switching transistors 51 and 52 (53 to 56) are not limited to an nMOS transistor, but a pMOS transistor, or other switching element may be applied.

Figure 32:
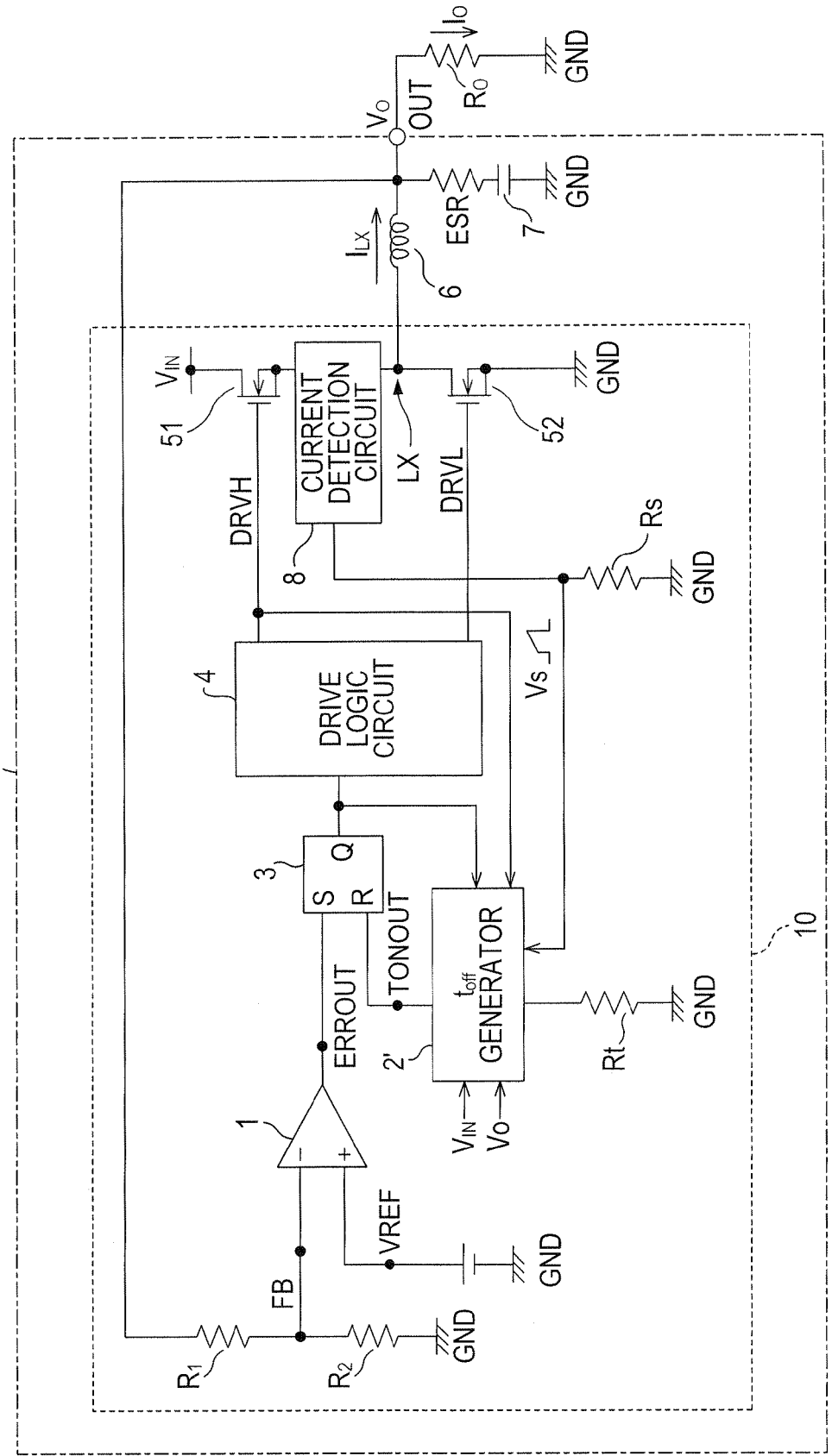
FIG. 32 is a block diagram schematically illustrating a power supply device according to an eighteenth embodiment.
Figure 33:
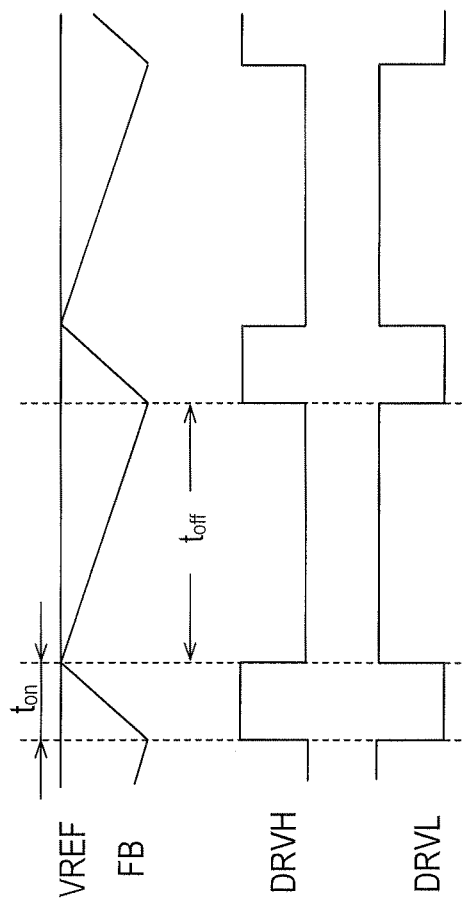
FIG. 33 illustrates an operation of the power supply device according to the eighteenth embodiment.

FIG. 32 is a block diagram schematically illustrating a power supply device according to an eighteenth embodiment. FIG. 33 illustrates an operation of the power supply device according to the eighteenth embodiment.

As may be seen from the comparison of FIGS. 32 and 33 and FIGS. 7 and 9 (waveform figure illustrating FB and VREF) according to the above described first embodiment, the eighteenth embodiment controls an off period "t off" instead of controlling an on period "t on."

In other words, according to the first embodiment, a DC-DC converter with a fixed on time controls the "on time" based on an output load current. However, according to the eighteenth embodiment, a DC-DC converter with a fixed off time controls the "off-time" based on an output load current.

As illustrated in FIG. 32, an output signal TONOUT of a $t_{off}$ generator 2' is supplied to a reset terminal R of an RS flip flop 3 and a normally fixed "t off" period is controlled instead of a normally fixed "t on" period according to the first embodiment.

As illustrated in FIG. 33, the comparator 1 compares a voltage FB obtained by dividing an output voltage Vo at the resistors R1 and R2 with a reference voltage VREF, and supplies an output signal ERROUT to an RS flip flop 3, and controls the output voltage Vo by adjusting control signals DRVH and DRVL for the switching transistors 51 and 52.

An inverted output XQ of the RS flip flop 3 is supplied to the drive logic circuit 4 and the inverted output XQ of the RS flip flop 3 is fed back to the $t_{off}$ generator 2' as well.

Figure 34:
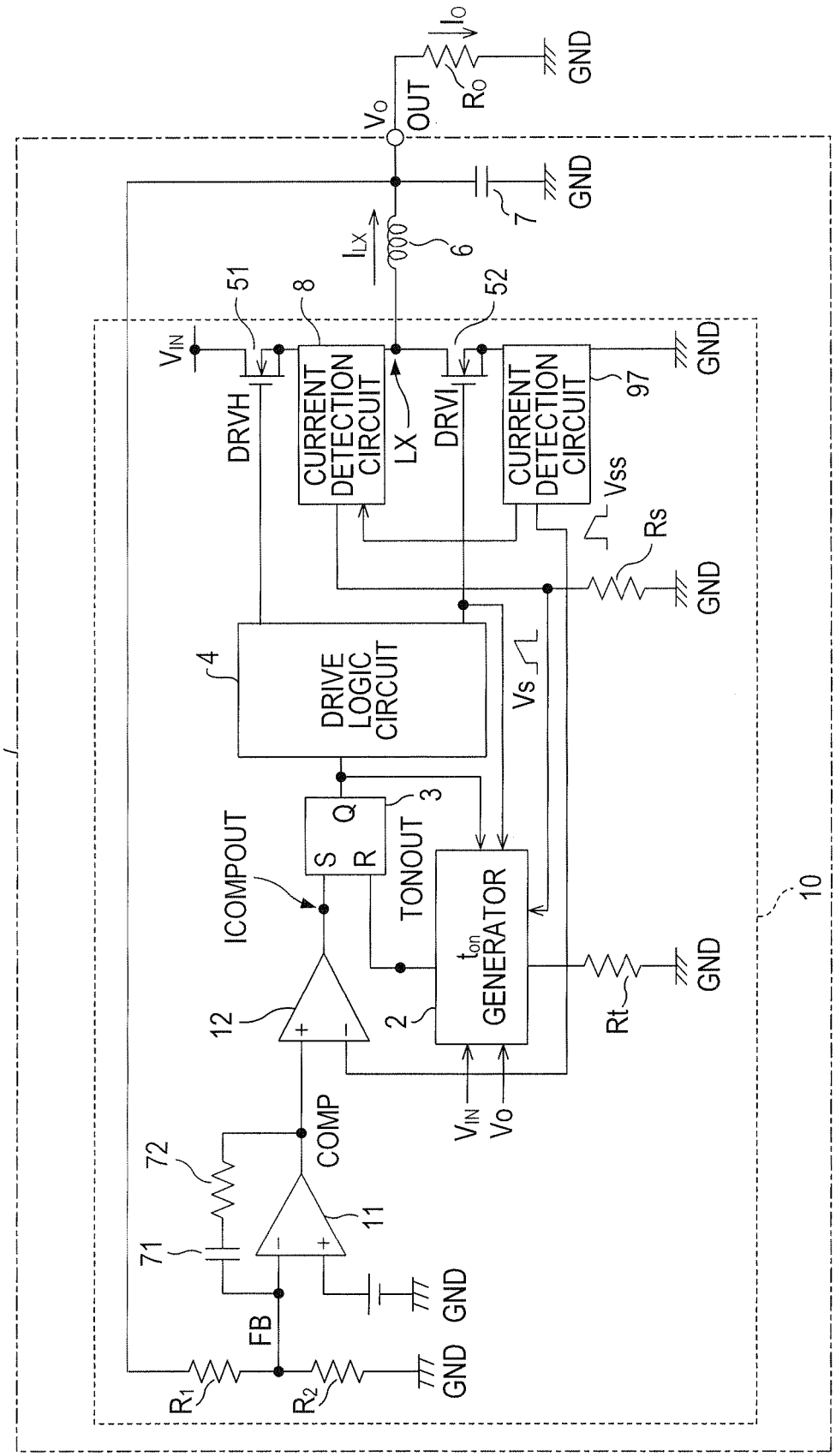
FIG. 34 is a block diagram schematically illustrating a power supply device according to a nineteenth embodiment.
Figure 35:
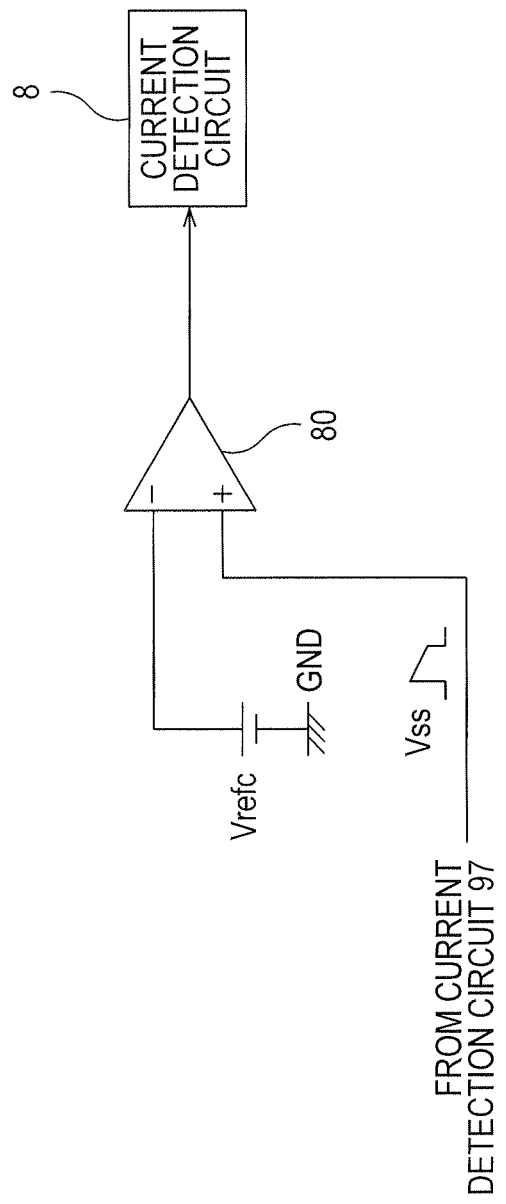
FIG. 35 illustrates a main part of the power supply device according to the nineteenth embodiment.

FIG. 34 is a block diagram schematically illustrating a power supply device according to a nineteenth embodiment. FIG. 35 illustrates a part of the power supply device according to the nineteenth embodiment.

As may be seen from the comparison of FIG. 34 and FIG. 22 according to the ninth embodiment, an operation of the current detection circuit 8 is controlled by using an output signal Vss of the current detection circuit (a current detection circuit for a ripple) 97.

In other words, as illustrated in FIG. 35, a comparator 80 compares an output signal Vss of the current detection circuit 97 with a reference voltage Vrefc, and if the Vss is smaller than the Vrefc, the output load current Io is assumed to be small (light load) and a control using an output signal Vs of the current detection circuit 8 is not performed.

This is because a control using an output signal Vs of the current detection circuit 8 of the above described embodiments is effective when the output load current Io is large and there is no need to control the fixed on period (or off period) under a no load or a light load condition.

Thus, according to the nineteenth embodiment, power consumption will be further reduced by stopping the current detection circuit 8 and the like under a no load or a light load condition.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A semiconductor integrated circuit, comprising:
    a first switching element that is controlled based on a first control signal and a second switching element that is controlled based on a second control signal, the first switching element and the second switching element being provided in series between a high-voltage power line and a low-voltage power line, the first switching element being provided on one side of the high-voltage power line and the second switching element being provided on one side of the low-voltage power line;
    a power supply circuit that outputs an output voltage by on/off controlling the first switching element and the second switching element;
    a current detection circuit, coupled to the first switching element and the second switching element, that detects a current corresponding to an output load current of the power supply circuit;
    a switching time control circuit that controls a switching time defined by a power supply voltage and the output voltage based on a current value detected by the current detection circuit;
    a switching element control circuit that controls the first switching element and the second switching element based on an output signal of the switching time control circuit; and
    a flip flop circuit, provided between the switching time control circuit and the switching element control circuit, including a reset terminal receiving an output of the switching time control circuit,
    wherein the switching time control circuit includes:
        a capacitor that is charged when the first switching element is turned on;
        a third switching element, coupled to one end of the capacitor, that is controlled based on the second control signal;
        a first comparator, coupled to the one end of the capacitor, which compares a voltage of the capacitor with a result obtained by adding a divided voltage of the output voltage and an output of the current detection circuit, and outputs an comparison result to the reset terminal of the flip flop circuit.

2. The semiconductor integrated circuit according to claim 1, wherein the power supply circuit comprises:
    a coil that applies a current from the first switching element and the second switching element to an output terminal via a connection node; and
    a smoothing capacitor that is provided between the output terminal and the low-voltage power line.

3. The semiconductor integrated circuit according to claim 2, wherein the current detection circuit is provided between the first switching element and the connection node.

4. The semiconductor integrated circuit according to claim 2, wherein the current detection circuit is provided between the high-voltage power line and the first switching element.

5. The semiconductor integrated circuit according to claim 2, wherein the current detection circuit is provided between the coil and the output terminal.

6. The semiconductor integrated circuit according to claim 2, wherein the current detection circuit is provided between the connection node and the coil.

7. The semiconductor integrated circuit according to claim 1, wherein the switching time control circuit controls an on time of the first switching element.

8. The semiconductor integrated circuit according to claim 1, further comprising:
a reference voltage generator that generates the reference voltage.

9. The semiconductor integrated circuit according to claim 8, wherein the power supply circuit controls the output voltage by using a ripple superimposed onto the output voltage by a parasitic resistance of the smoothing capacitor or by a resistor that is provided in series with the smoothing capacitor between the output terminal and the low-voltage power line; and the reference voltage generator generates the reference voltage in a fixed manner.

10. The semiconductor integrated circuit according to claim 8, wherein the output voltage is superimposed with a ripple by a high-pass filter that includes the coil and is supplied to the error comparator; and the reference voltage generator generates the reference voltage in a fixed manner.

11. The semiconductor integrated circuit according to claim 8, wherein the reference voltage generator generates the reference voltage onto which a ripple is superimposed.

12. The semiconductor integrated circuit according to claim 8, further comprising:
a ripple current detection circuit that is provided between the low-voltage power line and the second switching element.

13. The semiconductor integrated circuit according to claim 12, wherein the reference voltage generator generates the reference voltage to which a ripple is superimposed by adding a fixed voltage and an output voltage of the ripple current detection circuit.

14. The semiconductor integrated circuit according to claim 1 further comprising;
a ripple current detection circuit that is provided between the low-voltage power line and the second switching element;
an error amplifier that compares the output voltage with a reference voltage; and
a second comparator that compares an output signal of the error amplifier with an output signal of the ripple current detection circuit.

15. The semiconductor integrated circuit according to claim 14, wherein an operation of the current detection circuit is stopped if the output load current is small compared to an output of the ripple current detection circuit.

16. The semiconductor integrated circuit according to claim 1, wherein the power supply circuit includes a plurality of modes; and
the semiconductor integrated circuit further comprising:
a fourth switching element and a fifth switching element that are provided in series between an output terminal and the low-voltage power line; and
a mode control circuit that sets at least one of the plurality of modes; and
wherein the output terminal is coupled to the connection node through the third switching element and the coil.

17. The semiconductor integrated circuit according to claim 16, wherein the plurality of modes includes a buck mode, a boost mode, and a buck-boost.

18. A power supply device, comprising:
a semiconductor integrated circuit that includes:
a first switching element and a second switching element that are provided in series between a high-voltage power line and a low-voltage power line, the first switching element being provided on one side of the high-voltage power line and the second switching element being provided on one side of the low-voltage power line;
a power supply circuit that outputs an output voltage by on/off controlling the first switching element and the second switching element;
a current detection circuit that detects a current corresponding to an output load current of the power supply circuit;
a switching time control circuit that controls a switching time defined by a power supply voltage and the output voltage based on a current value detected by the current detection circuit;
a switching element control circuit that controls the first switching element based on a first control signal and the second switching element based on a second control signal, the first control signal and the second control signal being generated based on an output signal of the switching time control circuit;
a flip flop circuit, provided between the switching time control circuit and the switching element control circuit, including a reset terminal receiving an output of the switching time control circuit;
a coil that applies a current from the first switching element and the second switching element to an output terminal through a connection node; and
a smoothing capacitor that is provided between the output terminal and the low-voltage power line,
wherein the switching time control circuit includes:
a capacitor that is charged when the first switching element is turned on;
a third switching element, coupled to one end of the capacitor, that is controlled based on the second control signal; and
a comparator, coupled to the end of the capacitor, which compares a
voltage of the capacitor with a result obtained by adding a divided voltage of the output voltage and an output of the current detection circuit, and outputs an comparison result to the reset terminal of the flip flop circuit.

19. The semiconductor integrated circuit according to claim 1, wherein the switching time control circuit controls the switching time by a bottom detection comparator method for a fixed on-time DC-DC converter.

20. The semiconductor integrated circuit according to claim 18, wherein the switching time control circuit controls the switching time by a bottom detection comparator method for a fixed on-time DC-DC converter.

21. The semiconductor integrated circuit according to claim 1, wherein the switching element control circuit outputs a control signal for turning the first switching element off when the voltage of the capacitor exceeds the additional result.

22. The power supply device according to claim 18, wherein the switching element control circuit outputs a control signal for turning the first switching element off when the voltage of the capacitor exceeds the additional result.

* * * * *